(12) United States Patent
Hull et al.

(10) Patent No.: US 9,656,191 B2
(45) Date of Patent: May 23, 2017

(54) DRINKING CONTAINER AND FILTER ASSEMBLY

(71) Applicant: Rubbermaid Incorporated, Huntersville, NC (US)

(72) Inventors: Kenneth W. Hull, Huntersville, NC (US); Larry T. McKinney, Huntersville, NC (US); Jacob Connelly, Concord, NC (US)

(73) Assignee: RUBBERMAID INCORPORATED, Huntersville, NC (US)

( * ) Notice: Subject to any disclaimer, the term of this patent is extended or adjusted under 35 U.S.C. 154(b) by 19 days.

(21) Appl. No.: 14/589,593

(22) Filed: Jan. 5, 2015

(65) Prior Publication Data

US 2015/0122710 A1    May 7, 2015

Related U.S. Application Data

(63) Continuation of application No. 12/978,243, filed on Dec. 23, 2010, now Pat. No. 8,926,840, which is a
(Continued)

(51) Int. Cl.
*B01D 29/00* (2006.01)
*B01D 29/21* (2006.01)
(Continued)

(52) U.S. Cl.
CPC ......... *B01D 29/21* (2013.01); *A47G 19/2266* (2013.01); *A47G 19/2272* (2013.01);
(Continued)

(58) Field of Classification Search
CPC ....... B65D 55/16; A47G 19/2266; A45F 3/20; C02F 1/002; C02F 1/003; C02F 2201/006; C02F 2307/02; C02F 2307/1283
(Continued)

(56) References Cited

U.S. PATENT DOCUMENTS 218,719 A    8/1879  Doyle
591,668 A    10/1897 Johnson
(Continued)

FOREIGN PATENT DOCUMENTS

EP    0617951 A2    10/1994
EP    1243557 A1    9/2002

OTHER PUBLICATIONS

Product information for Bota of Boulder Outback Water Filtration System from www.botaofboulder.com (admitted prior art).

*Primary Examiner* — Anthony Stashick
*Assistant Examiner* — Ernesto Grano
(74) *Attorney, Agent, or Firm* — Marshall, Gerstein & Borun LLP

(57) ABSTRACT

A personal, portable drinking container has a bottle with a side wall, a closed bottom, a neck, a reservoir, and a top opening in the neck providing access to the reservoir. A cap is removably fitted on the neck to close the top opening. The bottle can have an annular formation in the side wall below the neck to prevent the neck from deforming when the bottle is squeezed. The side wall can have a pair of squeezable sides and a pair of opposed stiff sides below the annular formation, whereby the stiff sides help the bottle to rebound quickly after each squeeze.

20 Claims, 17 Drawing Sheets

Related U.S. Application Data continuation-in-part of application No. 12/406,949, filed on Mar. 18, 2009, now Pat. No. 8,245,870.

(60) Provisional application No. 61/037,679, filed on Mar. 18, 2008, provisional application No. 61/046,367, filed on Apr. 18, 2008.

(51) Int. Cl.
| | |
|---|---|
| A47G 19/22 | (2006.01) |
| B01D 29/88 | (2006.01) |
| B01D 35/143 | (2006.01) |
| B01D 39/18 | (2006.01) |
| B65D 1/32 | (2006.01) |
| C02F 1/00 | (2006.01) |
| C02F 1/28 | (2006.01) |

(52) U.S. Cl.
CPC .......... *B01D 29/88* (2013.01); *B01D 35/143* (2013.01); *B01D 39/18* (2013.01); *B65D 1/32* (2013.01); *C02F 1/002* (2013.01); *C02F 1/283* (2013.01)

(58) Field of Classification Search
USPC ....... 220/375, 709, 705, 737, 711, 725, 726, 220/728
See application file for complete search history.

(56) References Cited

U.S. PATENT DOCUMENTS

| | | | |
|---|---|---|---|
| 626,238 A | 6/1899 | Knapp | |
| 1,019,171 A | 3/1912 | Melville-Hamilton | |
| 1,301,676 A | 4/1919 | Fitzgerald | |
| 1,564,019 A | 12/1925 | Pierce | |
| 1,633,420 A | 6/1927 | Schlayer | |
| 1,672,466 A | 6/1928 | Oshman et al. | |
| 1,836,811 A | 12/1931 | McNeal | |
| 1,924,242 A | 8/1933 | Kaye | |
| 2,155,329 A | 4/1939 | Perdue | |
| 2,389,185 A | 11/1945 | Dick | |
| D174,205 S | 3/1955 | Ward | |
| 2,761,833 A | 9/1956 | Ward | |
| D185,121 S | 5/1959 | Tupper | |
| 2,911,128 A | 11/1959 | Krautkramer | |
| D193,121 S | 6/1962 | Wickman | |
| 3,147,824 A | 9/1964 | Henderson | |
| 3,181,725 A | 5/1965 | Friedl | |
| 3,335,917 A | 8/1967 | Knight | |
| 3,538,020 A | 11/1970 | Heskett | |
| D221,886 S | 9/1971 | Gruett | |
| D226,555 S | 3/1973 | Weber et al. | |
| 4,127,211 A | 11/1978 | Zerbey | |
| 4,298,475 A | 11/1981 | Gartner | |
| 4,441,996 A | 4/1984 | Hurst | |
| 4,448,316 A | 5/1984 | Hiroshige | |
| 4,478,346 A | 10/1984 | Spong | |
| 4,491,520 A | 1/1985 | Jaye | |
| 4,526,289 A | 7/1985 | Schiemann | |
| D280,802 S | 10/1985 | Cho | |
| 4,594,162 A | 6/1986 | Berger | |
| 4,669,641 A | 6/1987 | Holmes | |
| 4,681,677 A * | 7/1987 | Kuh et al. ....................... 210/88 |
| 4,695,379 A | 9/1987 | Nohren, Jr. et al. | |
| 4,700,856 A * | 10/1987 | Campbell et al. ........... 215/11.3 |
| 4,728,037 A | 3/1988 | Mainhardt | |
| 4,764,274 A | 8/1988 | Miller | |
| 4,769,144 A | 9/1988 | Nohren, Jr. | |
| 4,800,018 A | 1/1989 | Moser | |
| 4,811,865 A | 3/1989 | Mueller, Jr. et al. | |
| 4,895,648 A | 1/1990 | Hankammer | |
| 4,938,389 A | 7/1990 | Rossi et al. | |
| 4,979,654 A | 12/1990 | Nohren, Jr. | |
| 4,986,901 A | 1/1991 | Nohren, Jr. et al. | |
| 4,995,976 A | 2/1991 | Vermes et al. | |
| 5,044,512 A | 9/1991 | Giancaspro et al. | |
| 5,045,195 A | 9/1991 | Spangrud et al. | |
| 5,090,583 A | 2/1992 | Hoffman et al. | |
| 5,122,272 A | 6/1992 | Iana et al. | |
| 5,156,335 A | 10/1992 | Smith et al. | |
| 5,167,819 A | 12/1992 | Iana et al. | |
| 5,188,251 A | 2/1993 | Kusz | |
| 5,211,973 A | 5/1993 | Nohren, Jr. | |
| D337,939 S | 8/1993 | Smith, Jr. | |
| 5,238,153 A | 8/1993 | Castillo et al. | |
| D339,503 S | 9/1993 | Callaway | |
| D342,449 S | 12/1993 | Mattheis | |
| 5,273,649 A | 12/1993 | Magnusson et al. | |
| 5,299,701 A | 4/1994 | Barker et al. | |
| D351,313 S * | 10/1994 | Giard, Jr. ....................... D7/510 |
| 5,401,399 A | 3/1995 | Magnusson et al. | |
| 5,417,860 A | 5/1995 | Kay | |
| 5,431,813 A | 7/1995 | Daniels | |
| D361,922 S | 9/1995 | Van Dyk | |
| D370,711 S | 6/1996 | Serenko et al. | |
| 5,533,767 A | 7/1996 | Georgopoulos et al. | |
| 5,545,315 A | 8/1996 | Lonneman | |
| 5,573,525 A | 11/1996 | Watson et al. | |
| 5,601,199 A | 2/1997 | Marty | |
| 5,605,257 A | 2/1997 | Beard | |
| 5,609,759 A | 3/1997 | Nohren, Jr. et al. | |
| 5,635,079 A | 6/1997 | Becking, II | |
| 5,674,391 A | 10/1997 | Nohren, Jr. | |
| 5,677,047 A | 10/1997 | Thomas | |
| 5,681,463 A | 10/1997 | Shimizu et al. | |
| D391,448 S | 3/1998 | Winer et al. | |
| 5,733,448 A | 3/1998 | Kaura | |
| 5,762,797 A | 6/1998 | Patrick et al. | |
| 5,840,185 A | 11/1998 | Hughes et al. | |
| 5,868,933 A | 2/1999 | Patrick et al. | |
| 5,873,995 A * | 2/1999 | Huang et al. ................... 210/87 |
| 5,914,045 A | 6/1999 | Palmer et al. | |
| 5,919,365 A | 7/1999 | Collette | |
| 5,928,512 A | 7/1999 | Hatch et al. | |
| D413,067 S | 8/1999 | Haley | |
| 5,957,339 A | 9/1999 | Deni et al. | |
| 5,989,424 A | 11/1999 | Serenko et al. | |
| 5,997,734 A * | 12/1999 | Koski et al. .................... 210/87 |
| 6,004,460 A | 12/1999 | Palmer et al. | |
| 6,033,557 A | 3/2000 | Gebhard et al. | |
| 6,058,971 A | 5/2000 | Palmer et al. | |
| 6,079,589 A | 6/2000 | Matsuyama et al. | |
| 6,096,206 A * | 8/2000 | Huang ..................... C02F 1/64 210/202 |
| 6,117,319 A | 9/2000 | Cranshaw | |
| 6,136,188 A | 10/2000 | Rajan et al. | |
| 6,136,189 A | 10/2000 | Smith et al. | |
| 6,153,096 A | 11/2000 | Nonren, Jr. | |
| 6,165,362 A | 12/2000 | Nohren, Jr. et al. | |
| 6,193,886 B1 | 2/2001 | Nohren, Jr. | |
| 6,197,193 B1 | 3/2001 | Archer | |
| 6,200,471 B1 | 3/2001 | Nohren, Jr. | |
| 6,221,416 B1 | 4/2001 | Nohren, Jr. | |
| D442,434 S | 5/2001 | Klima et al. | |
| 6,227,399 B1 | 5/2001 | Angus et al. | |
| D443,337 S | 6/2001 | Mark et al. | |
| 6,283,308 B1 | 9/2001 | Patil et al. | |
| 6,303,023 B1 * | 10/2001 | Gebhard et al. ................. 210/85 |
| 6,344,146 B1 | 2/2002 | Moorehead et al. | |
| 6,395,170 B1 | 5/2002 | Hughes et al. | |
| 6,468,435 B1 | 10/2002 | Hughes et al. | |
| 6,478,180 B1 | 11/2002 | Dehn, Sr. | |
| 6,478,956 B2 | 11/2002 | Kaura | |
| 6,540,916 B2 | 4/2003 | Patil | |
| 6,565,743 B1 | 5/2003 | Poirier et al. | |
| 6,569,329 B1 | 5/2003 | Nohren, Jr. | |
| D478,005 S | 8/2003 | Sali | |
| 6,602,406 B1 | 8/2003 | Nohren et al. | |
| D482,620 S * | 11/2003 | Kleckauskas et al. ........ D9/530 |
| 6,641,719 B1 | 11/2003 | Naito | |
| 6,656,350 B2 | 12/2003 | Kitakaze | |
| 6,722,514 B2 * | 4/2004 | Renz ............................ 215/384 |
| 6,733,669 B1 | 5/2004 | Crick | |

(56) References Cited

U.S. PATENT DOCUMENTS

| | | |
|---|---|---|
| D496,559 S | 9/2004 | Bodum |
| 6,811,846 B1 * | 11/2004 | Ota et al. .................... 428/35.9 |
| 6,837,390 B2 * | 1/2005 | Lane et al. .................... 215/381 |
| D501,362 S | 2/2005 | Gauss |
| 6,910,589 B1 | 6/2005 | Rose et al. |
| 6,919,025 B2 | 7/2005 | Cluff et al. |
| D510,270 S * | 10/2005 | Khalifa .................... D9/503 |
| D515,869 S | 2/2006 | Mills et al. |
| 7,014,050 B1 | 3/2006 | Ogata et al. |
| 7,040,499 B1 | 5/2006 | Reif |
| 7,081,201 B2 | 7/2006 | Bassett et al. |
| D528,862 S | 9/2006 | Li |
| D528,910 S | 9/2006 | Kingsley |
| D529,338 S | 10/2006 | Poulson et al. |
| D530,200 S | 10/2006 | Kingsley |
| 7,125,490 B2 | 10/2006 | Clendenning et al. |
| D536,929 S | 2/2007 | Kingsley |
| D537,676 S | 3/2007 | Kingsley |
| D555,428 S | 11/2007 | Tulett |
| 7,297,281 B2 | 11/2007 | Ali |
| D556,575 S | 12/2007 | Nusbaum et al. |
| 7,311,752 B2 | 12/2007 | Tepper et al. |
| D565,353 S | 4/2008 | Roth et al. |
| D565,416 S | 4/2008 | Lepoitevin |
| D566,468 S | 4/2008 | Sandy |
| 7,390,343 B2 | 6/2008 | Tepper et al. |
| 7,427,355 B2 | 9/2008 | Chau |
| 7,473,362 B1 | 1/2009 | Nohren, Jr. |
| D588,871 S | 3/2009 | Miller et al. |
| D591,160 S | 4/2009 | Windmiller |
| D596,458 S | 7/2009 | McKinney |
| D596,459 S * | 7/2009 | Ghiassi .................... D7/510 |
| 7,670,479 B2 | 3/2010 | Arett et al. |
| 8,245,870 B2 | 8/2012 | McKinney et al. |
| 8,926,840 B2 | 1/2015 | Hull et al. |
| 2002/0036176 A1 | 3/2002 | Hughes et al. |
| 2002/0060176 A1 | 5/2002 | Mierau et al. |
| 2002/0088745 A1 | 7/2002 | Barlow |
| 2004/0164079 A1 | 8/2004 | Alois |
| 2005/0035041 A1 | 2/2005 | Nohren et al. |
| 2005/0051476 A1 | 3/2005 | Chen et al. |
| 2005/0139540 A1 | 6/2005 | Mierau et al. |
| 2005/0199631 A1 | 9/2005 | Alois |
| 2005/0247714 A1 | 11/2005 | Backes et al. |
| 2005/0274741 A1 | 12/2005 | Cho |
| 2005/0279768 A1 | 12/2005 | Chatrath |
| 2006/0157398 A1 | 7/2006 | Nohren |
| 2006/0191824 A1 * | 8/2006 | Arett et al. .................... 210/85 |
| 2006/0249442 A1 | 11/2006 | Yap et al. |
| 2007/0158251 A1 | 7/2007 | Chau |
| 2008/0041809 A1 | 2/2008 | Shek |
| 2008/0067120 A1 | 3/2008 | Chatrath |
| 2008/0087624 A1 | 4/2008 | Buckley |
| 2008/0121583 A1 | 5/2008 | Nohren |
| 2008/0203005 A1 | 8/2008 | Francisco et al. |
| 2008/0203007 A1 | 8/2008 | Jang et al. |
| 2008/0251443 A1 | 10/2008 | Ali |
| 2009/0008318 A1 | 1/2009 | Anes et al. |
| 2009/0039037 A1 | 2/2009 | O'Brien et al. |
| 2009/0236341 A1 | 9/2009 | McKinney et al. |
| 2011/0278206 A1 | 11/2011 | Hull et al. |
| 2012/0031511 A1 * | 2/2012 | Farley .................... 137/544 |

* cited by examiner

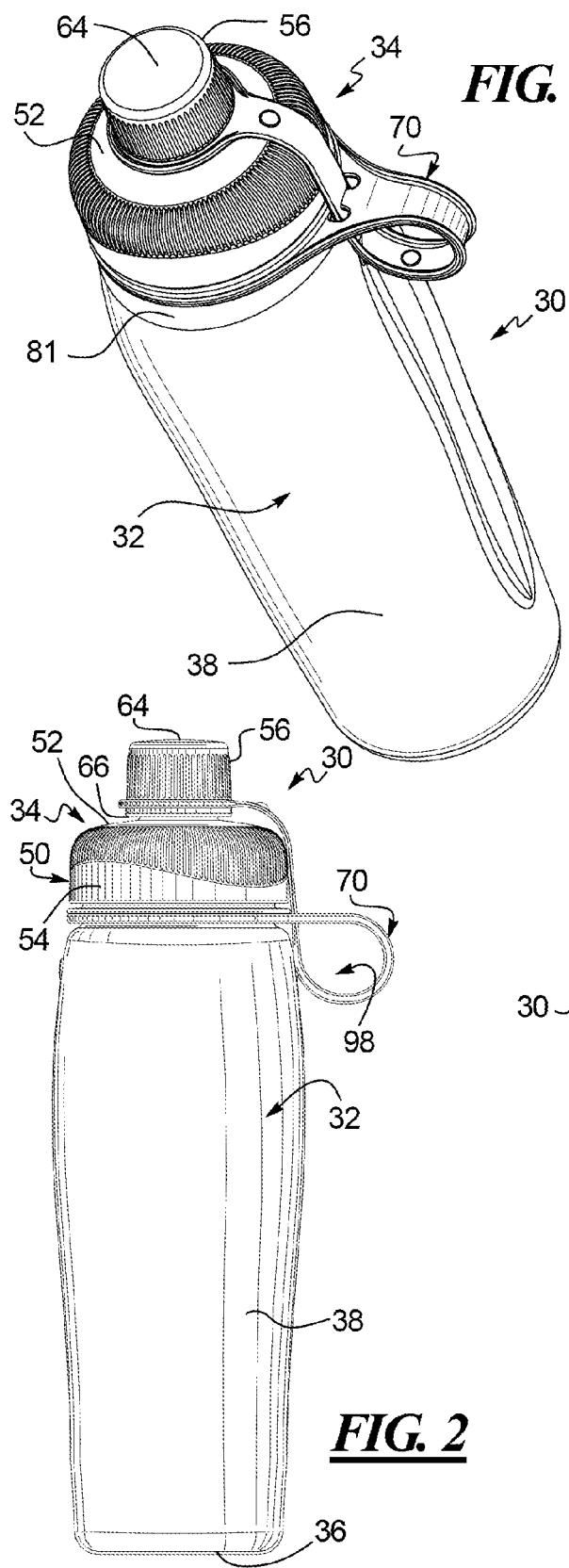

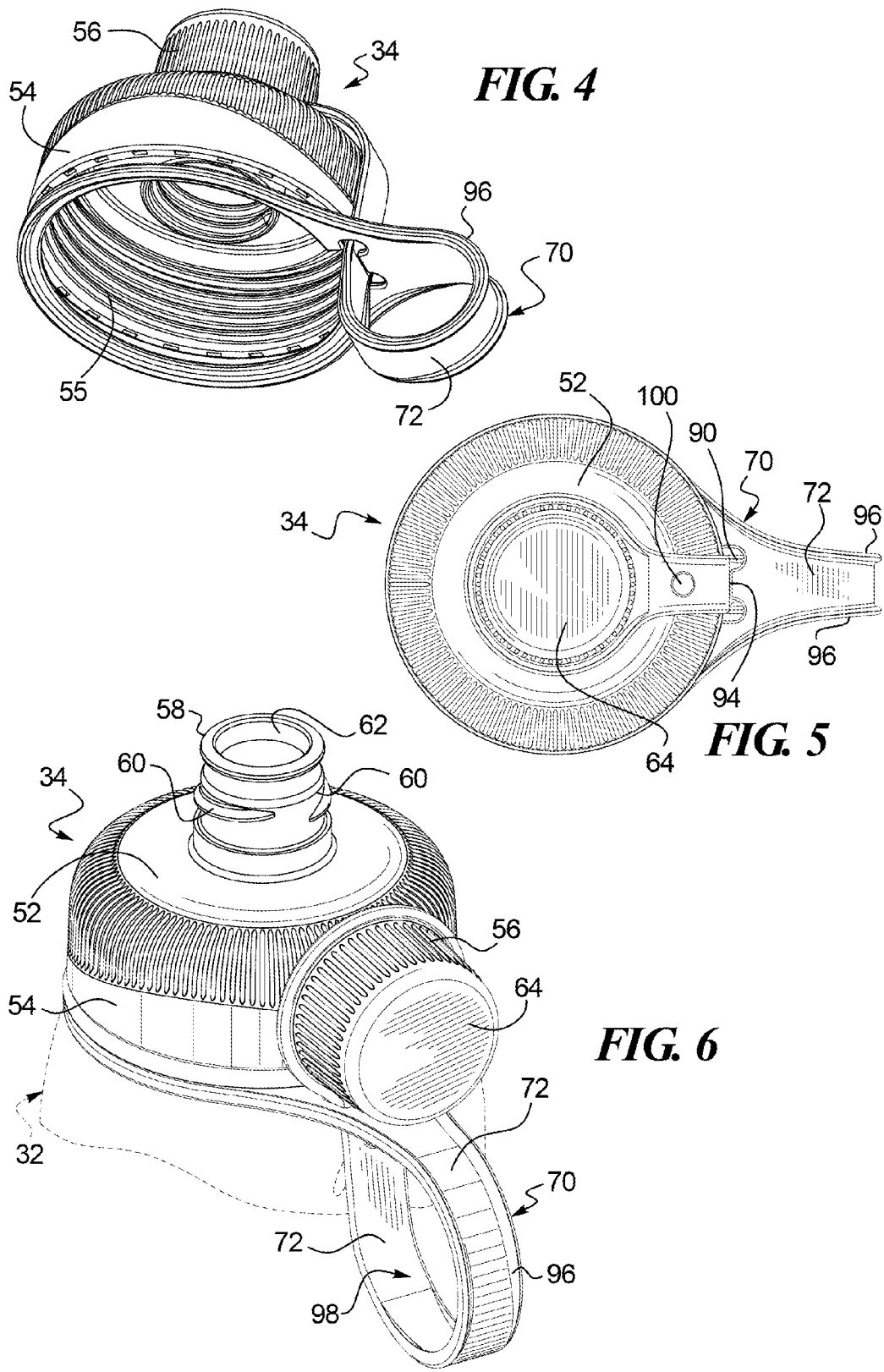

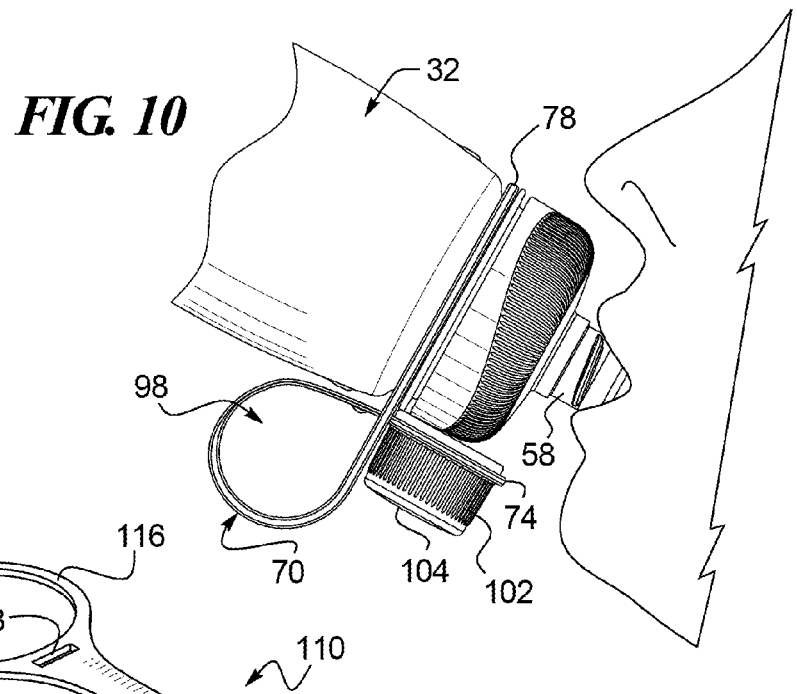
FIG. 10
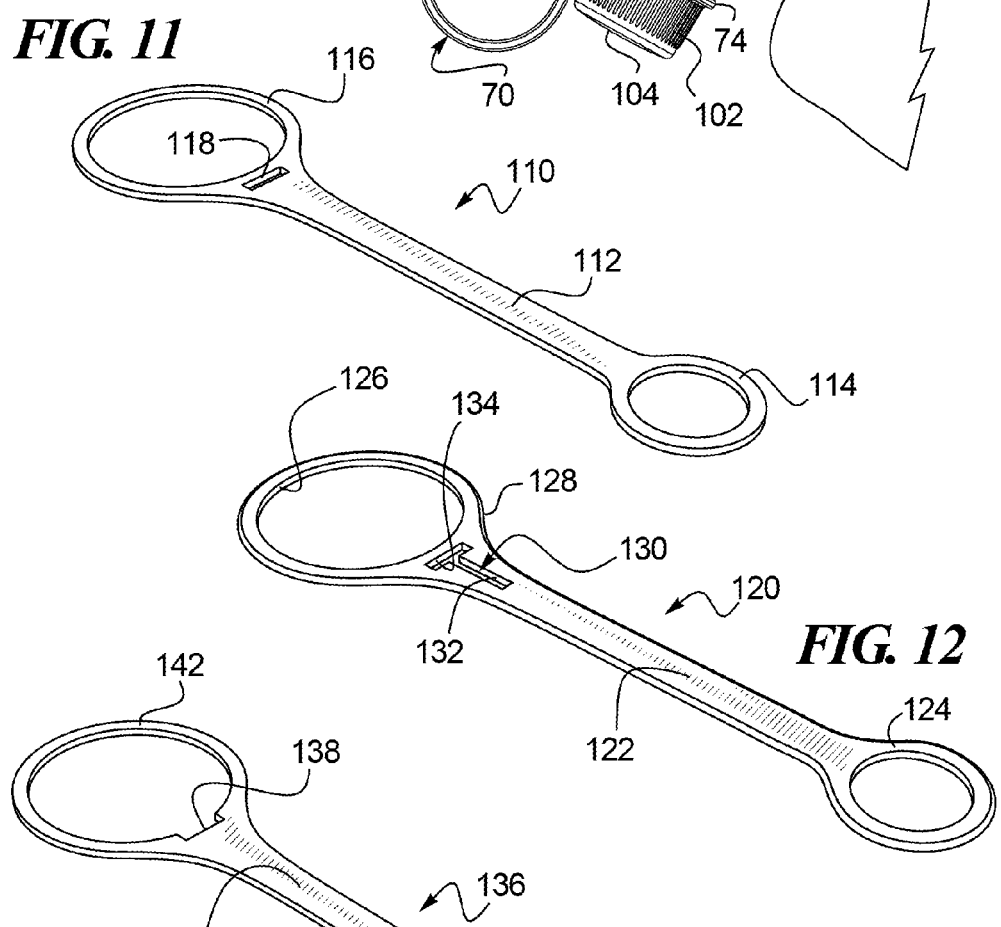
FIG. 11
FIG. 12
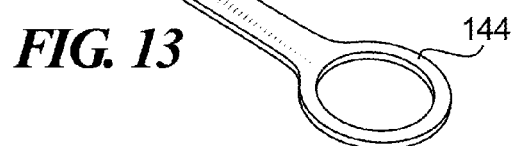
FIG. 13

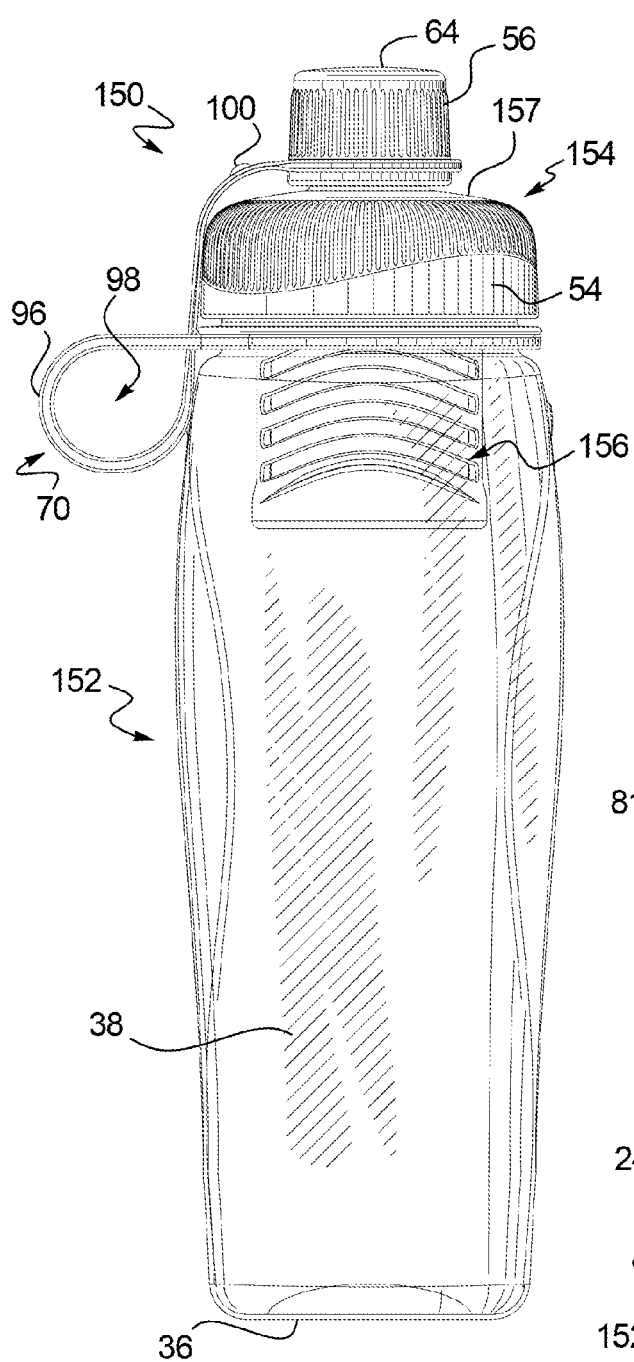
FIG. 14
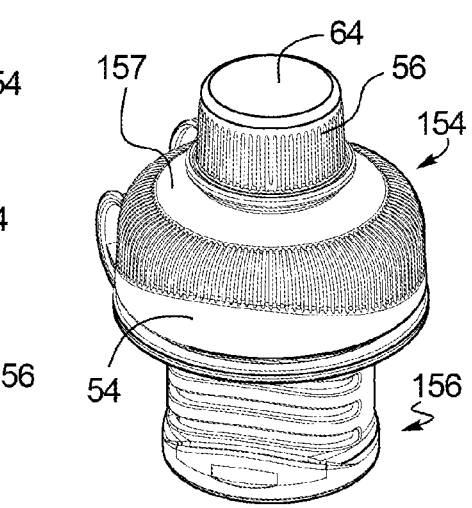
FIG. 15
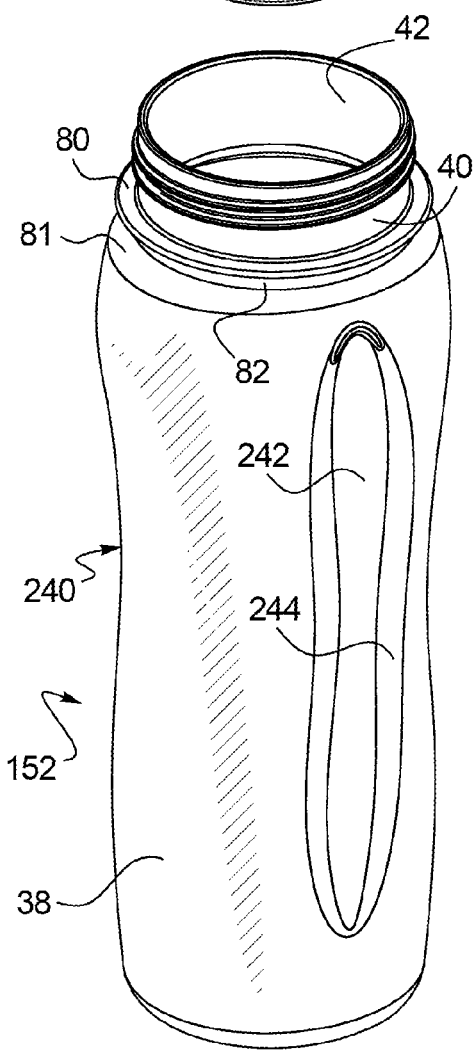

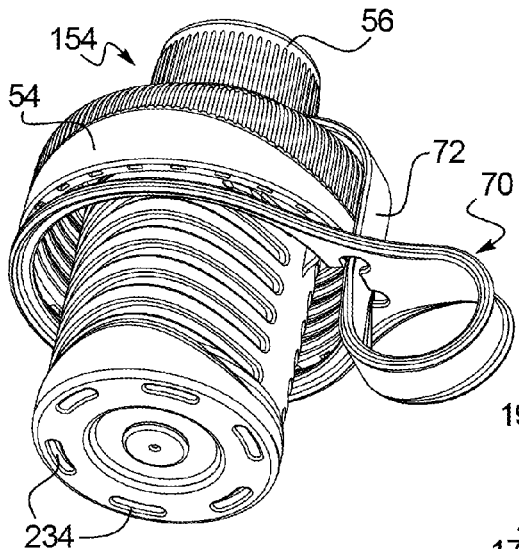
FIG. 16
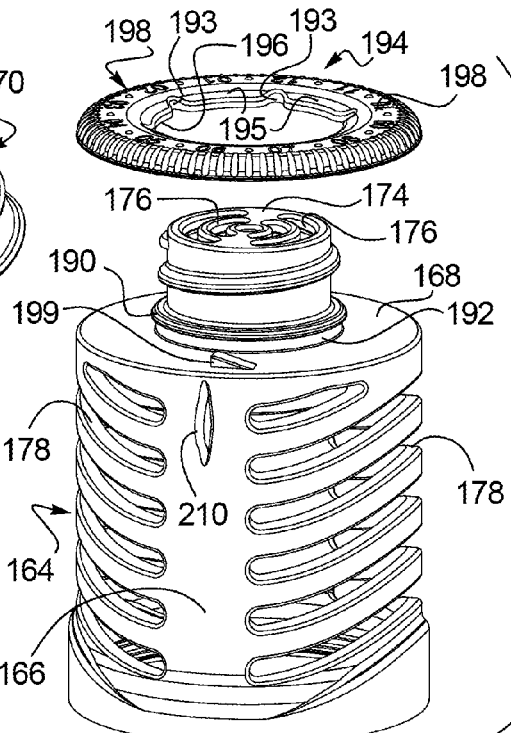
FIG. 18
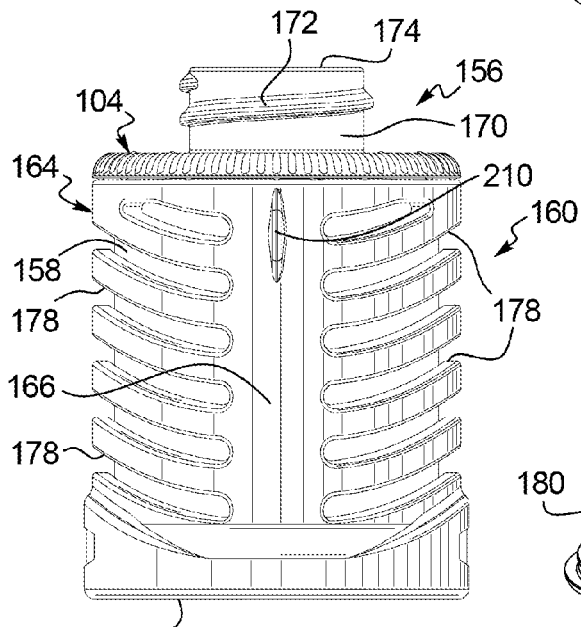
FIG. 17
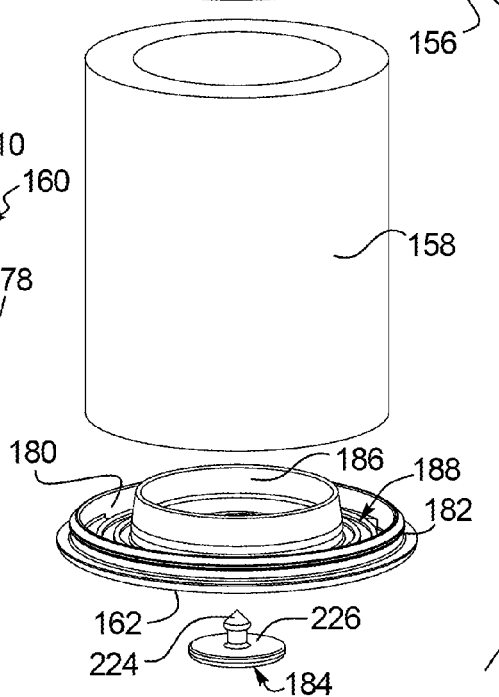

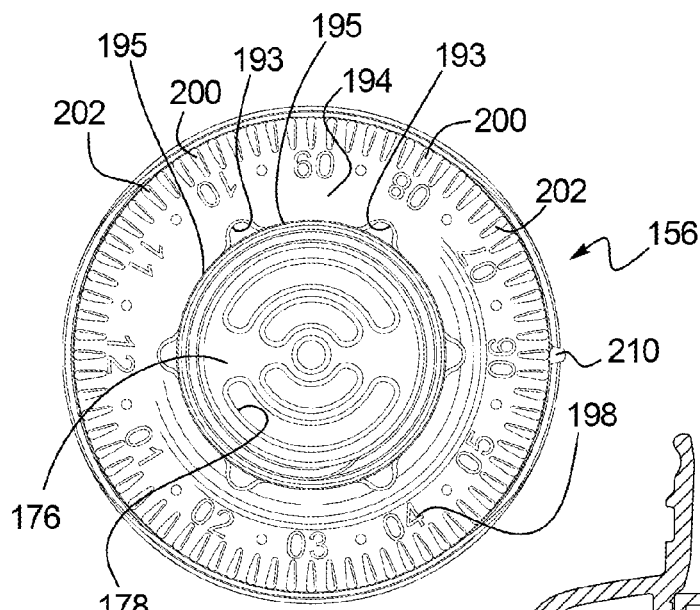
FIG. 19
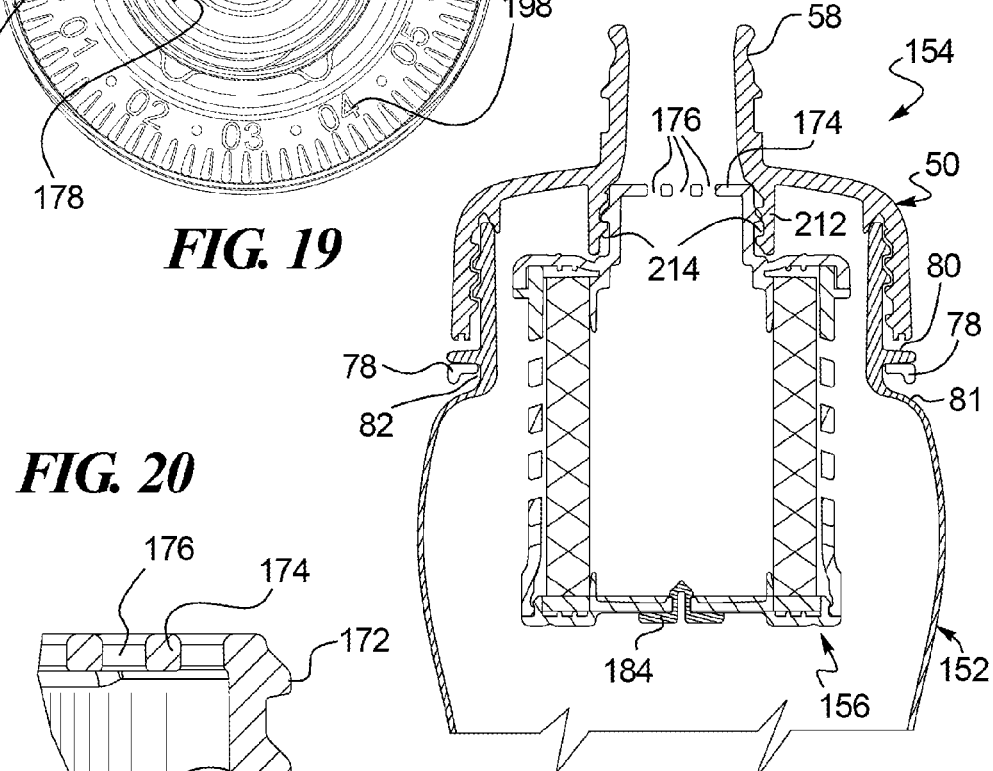
FIG. 20
FIG. 21
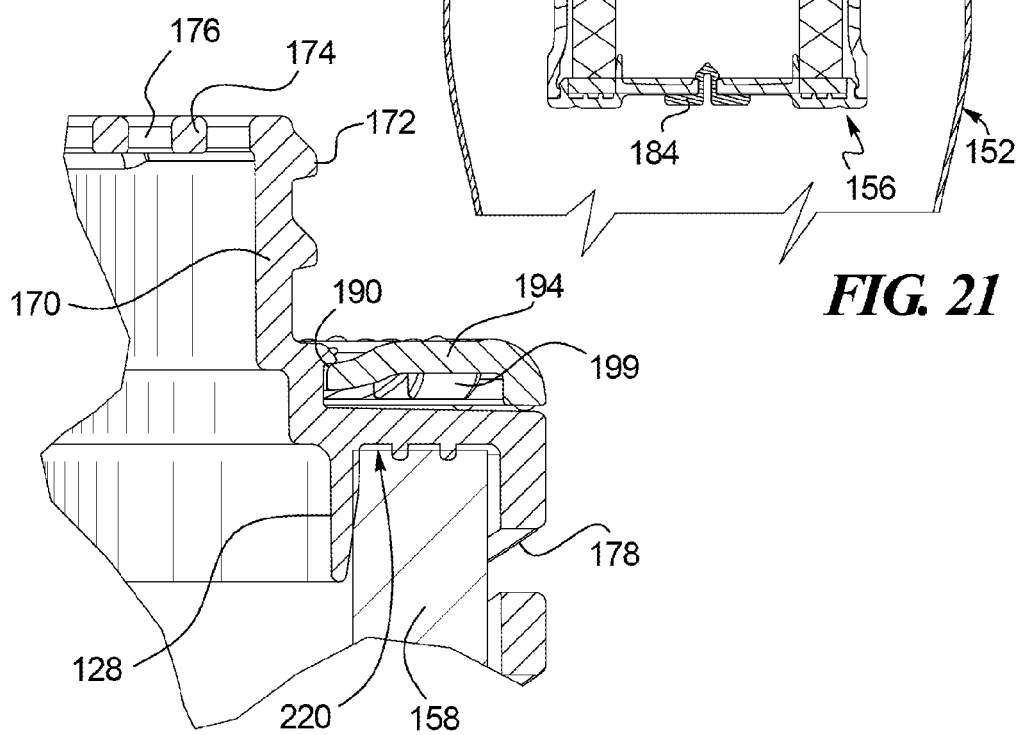

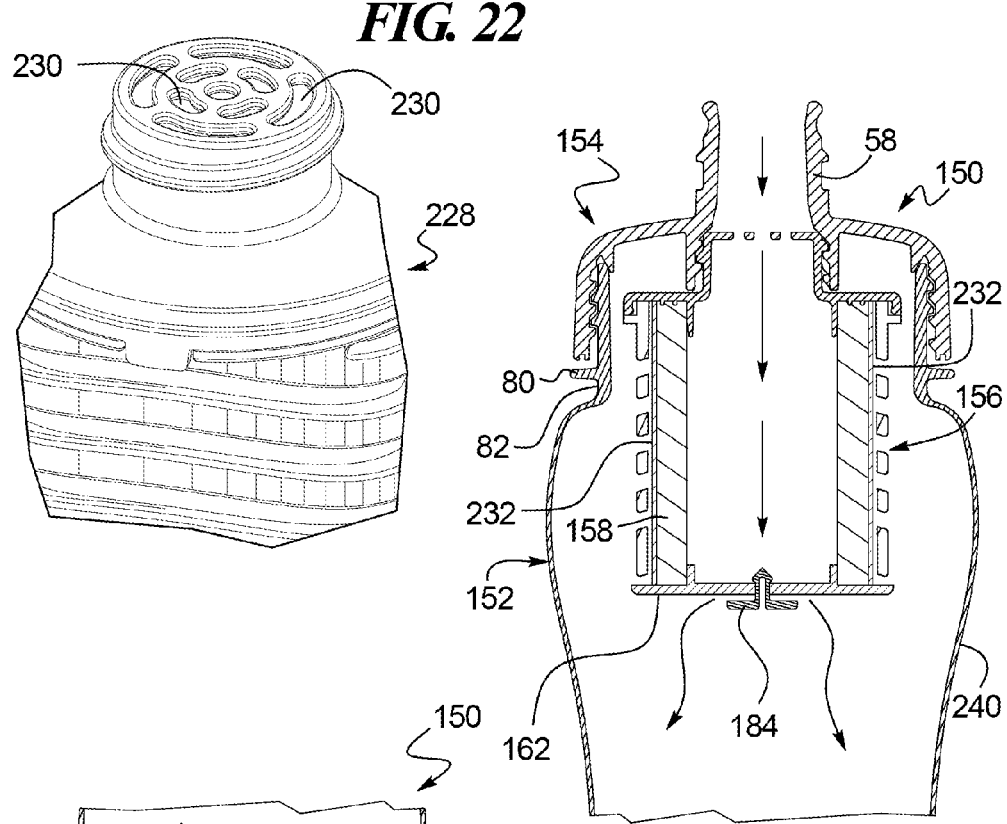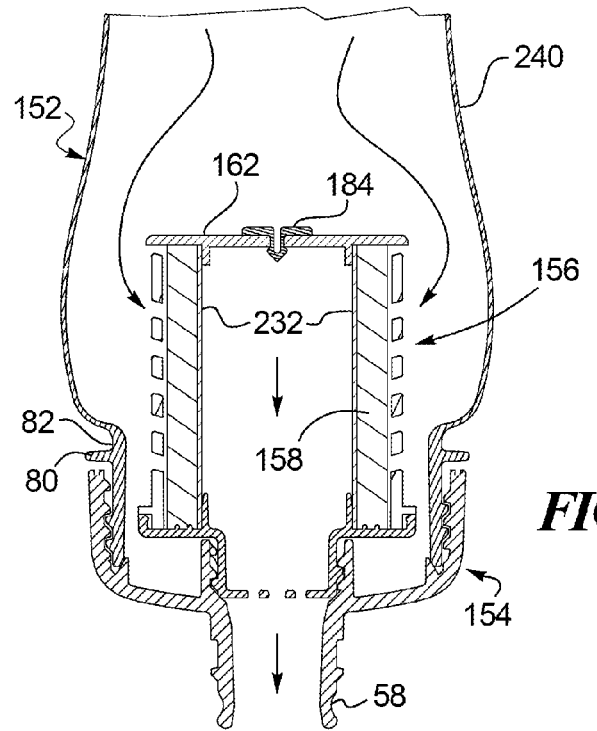

FIG. 27
FIG. 28
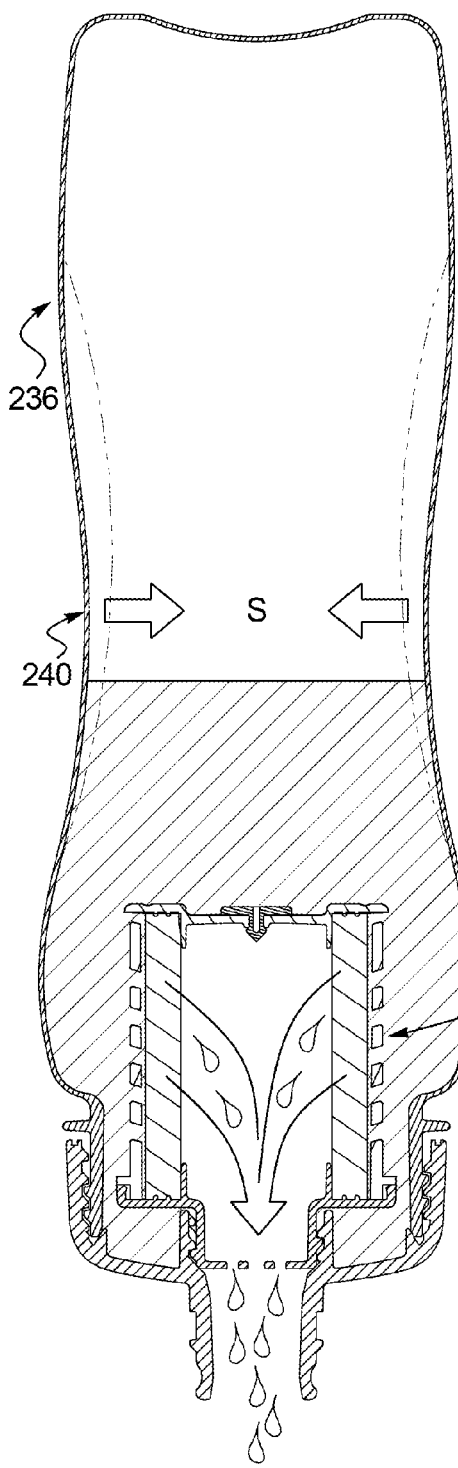
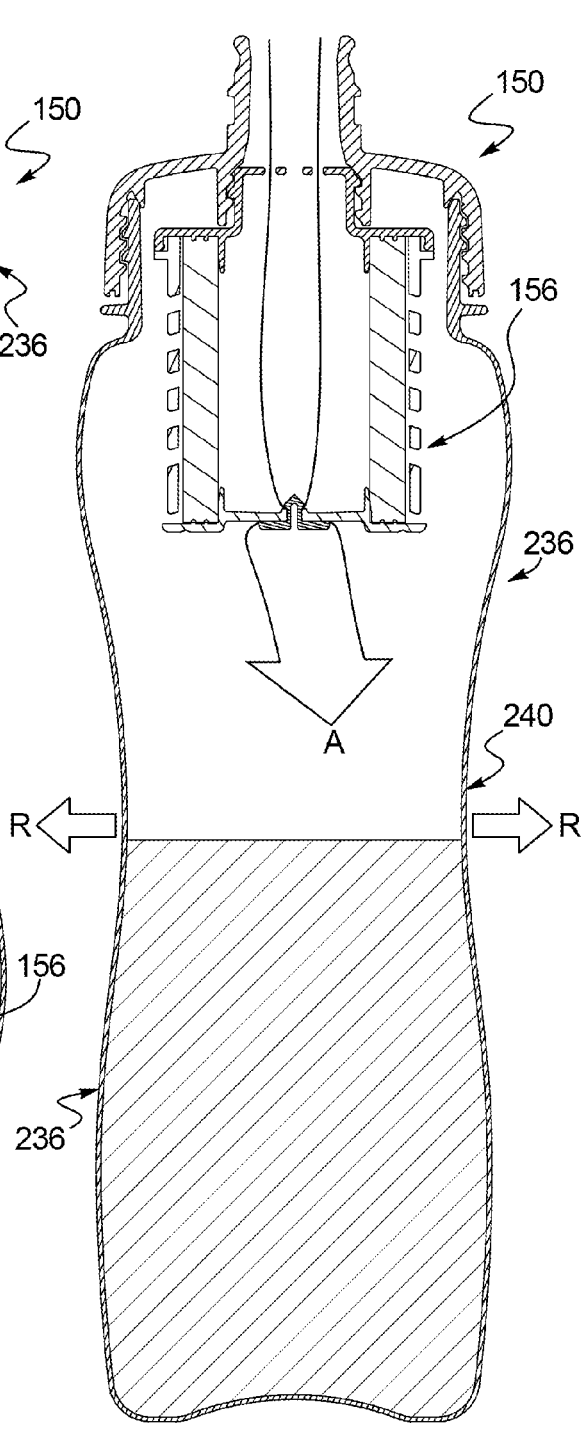

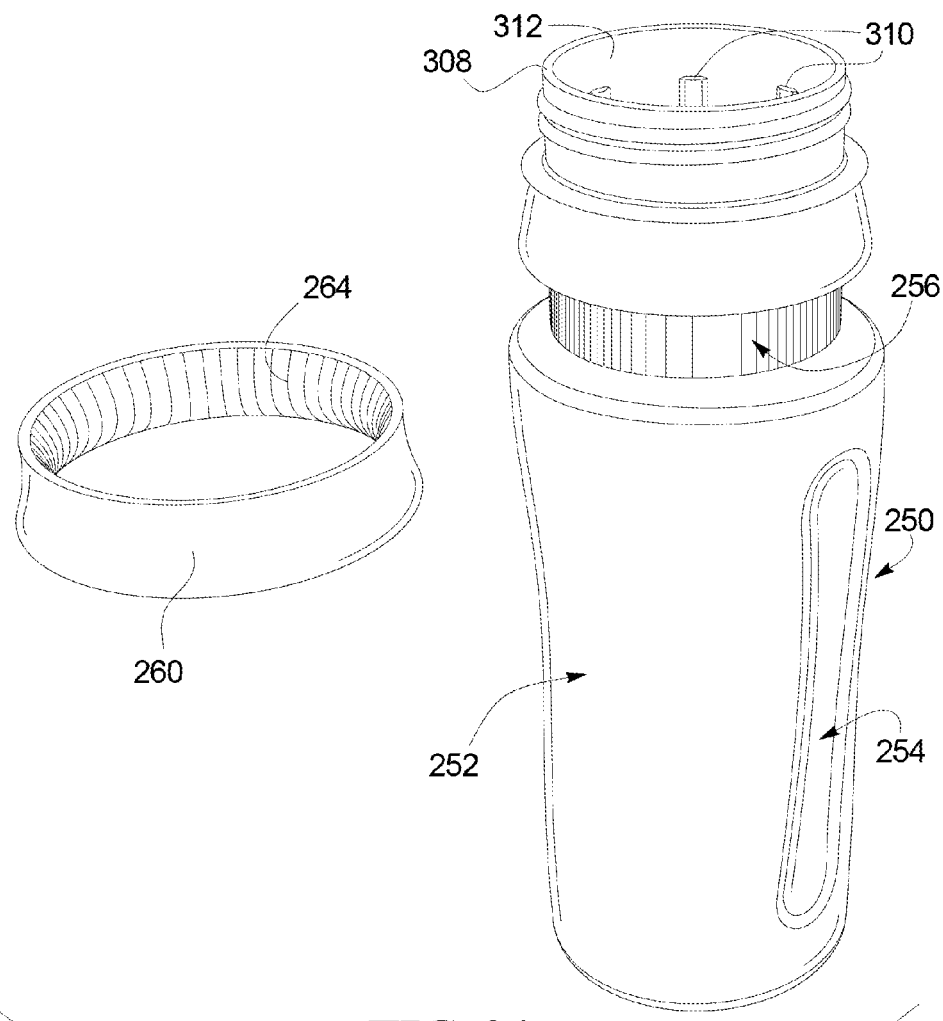
*FIG. 31a*
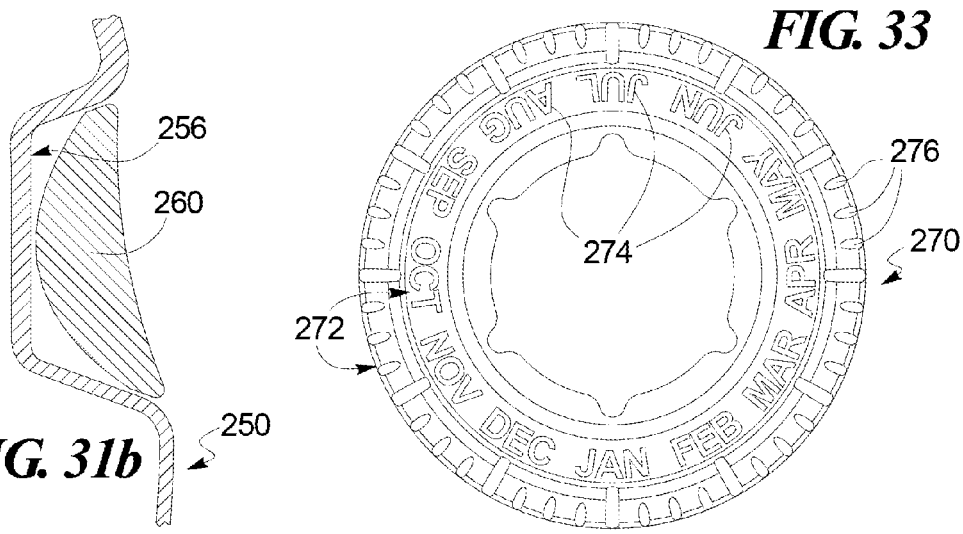
*FIG. 31b*
*FIG. 33*

DRINKING CONTAINER AND FILTER ASSEMBLY

RELATED APPLICATION DATA

This patent is a continuation of U.S. application Ser. No. 12/978,243 entitled "Drinking Container and Filter Assembly" and filed Dec. 23, 2010, which is a continuation-in-part of U.S. application Ser. No. 12/406,949 entitled "Container Cap with Tether" and filed Mar. 18, 2009, which is related to and claims priority benefit of U.S. provisional patent application Ser. Nos. 61/037,679 filed Mar. 18, 2008 and 61/046,367 filed Apr. 18, 2008, each entitled "Drinking Container." Each of the above-noted prior filed applications is hereby incorporated herein by reference in its entirety.

BACKGROUND OF THE INVENTION

1. Field of the Disclosure

The present disclosure is generally directed to reusable drinking containers, and more particularly to a personal drinking container employing a re-usable and/or replaceable water filter.

2. Description of Related Art

Personal drinking containers are known in the art and can have a strap or tether to retain a cap assembly on the bottle of the container. Some cap straps can provide dual functions. The straps both retain the cover or cap assembly connected to the bottle and can create a finger hold or belt loop for carrying the container. Some known straps are quite stiff and are configured and arranged in such a way that keeps the cap positioned close to the mouth of the bottle when removed from the mouth. As a result, the cap can interfere with drinking from and refilling of the bottle. Such a cap must typically be manually held away from the user's face by one hand in order for a user to drink from the beverage container opening or to refill the bottle. Other known straps are limp or soft and completely flexible. The cap tethered by such a strap must still be held out of the way because the cap can freely swing about or dangle and interfere with drinking or refilling.

Some known drinking containers have bottles made of a resilient flexible material, such as polyethylene or polypropylene. Many of these flexible bottles make use of a one-way drinking spout configured to allow the user to squeeze the bottle repeatedly to dispense the contents. Many of these bottles, once squeezed, do not rebound very quickly. Significant return air flow is thus required through the drinking spout to aid in bottle rebound. Other bottles are made of a more rigid material, such as polycarbonate, stainless steel, aluminum, or PVC, and cannot be squeezed. Many of these types of bottles require the user to drink from the wide mouth opening of the bottle or through a straw. Liquid is dispensed from this type of bottle via gravity through a wide mouth opening or by suction through a straw type device.

Consumers purchase large amounts of bottled water in the U.S. and worldwide. Reasons given for such purchases are: taste, convenience, cold water temperature, consistency, safety, and/or as a healthier option to tap water or public water sources. Such consumer purchases produce a massive amount of plastic waste, much of which never gets recycled but instead ends up in landfills or simply polluting the environment. Bottled water is also extremely expensive in comparison to no cost public source options. However, many consumers simply believe bottled water tastes better. A number of companies offer water filtration options to improve the taste of conventional tap water as well as to purify tap water. Many of these options involve mounting a filtration system to a tap faucet or storing a pitcher or jug with a filter in one's refrigerator. However, these solutions are not portable.

Users may require or simply wish to fill or refill a bottle when away from a reliable source of potable water. There are several known water bottles configured to include a filtration system or replaceable filter. Some portable water filtration systems, though "portable" and/or "replaceable" may not be easily and quickly used "on the go." Some require that the water be manually pumped through a filter to a temporary storage container before dispensing for drinking. Others have a charcoal filter that can be employed to filter water within the bottle. These types of filters often deposit larger chunks of filter media, such as charcoal grit, and/or much smaller "fines" of the filter media, such as charcoal fines, into the filtered water reservoir or the stream of water to be consumed. Many of these solutions offer very good filtering capability for purifying non-clean water sources. However, the devices can make dispensing water from a filtered reservoir difficult by requiring pumping or excessive dispensing force.

Consumers also may not be certain when a filter medium should be replaced. Virtually all filter media will eventually reach a point where its filtering capability is spent. The filter media when spent will either no longer function to filter out the desired chemicals and contaminants or at least become increasingly less effective in doing so.

Additionally, the filter media and structure of a filter assembly may inhibit or decrease the free flow of water when dispensed from the bottle. Some application of positive pressure is typically required to dispense water from a personal filtration bottle. It typically requires a relatively large amount of force or pressure to pass water through a filter media. Finer or denser filter media may typically provide better filter performance, but will likely degrade bottle performance and the overall drinking experience for many or most users. The bottle can be much more difficult to squeeze when dispensing liquid because of the significant pressure that is required to force liquid through the filter media. Further, the filter construction and media can inhibit the return air flow back into the bottle once water is dispensed from the bottle. The bottle may not spring back or bounce back very quickly when squeezed because air cannot readily reenter the bottle through the filter media to replace the void left by dispensed liquid. Each of these problems can lessen the positive drinking experience for the user.

Another problem with filtered containers of this type is encountered when refilling the bottle. Refilling typically requires that the filter first be removed. Many filters are attached to the cap, which must be removed to refill the bottle. The filter and/or cap may be placed on a surface near the refill water source. The filter can become contaminated if not placed on a clean surface when doing so. Alternatively, the user can hold the filter and/or cap while refilling the bottle. Holding the filter and cap can be cumbersome and may inhibit the use of one hand during refilling.

SUMMARY OF THE INVENTION

In one example according to the teachings of the present invention, a personal, portable drinking container includes a bottle having a side wall, a closed bottom end, a neck at a top end, a reservoir within the bottle, and a top opening at a top edge of the neck. The top opening provides access to the reservoir. A cap is removably fitted on the neck to close off the top opening. A ledge can be provided on an interior surface of the bottle positioned below the top edge. A filter assembly can be supported by and suspended on the ledge within the bottle.

In one example, the drinking container can have a ledge to support a filter assembly and the ledge can be formed on an inner surface of the neck below the top edge.

In one example, the drinking container can have a ledge to support a filter assembly and the ledge can be formed as at least one protrusion projecting inward from an interior surface of the neck.

In one example, the drinking container can have a ledge to support a filter assembly and the ledge can be formed by a plurality of protrusions spaced circumferentially around an interior surface of the neck.

In one example, the drinking container can have a ledge to support a filter assembly and the ledge can be formed by a plurality of protrusions spaced circumferentially around an inner surface of the neck below the top edge.

In one example, the filter assembly can have a housing sized to fit within the neck and bypass a ledge on an inner surface of the neck can have at least one support element protruding radially outward from the housing and sized and positioned to rest on the ledge.

In one example, the filter assembly can have a support element to suspend the filter assembly within the neck of the bottle. The support element can be an annular flange of a size larger than the housing that fits within the neck and rests on a ledge on an inner surface of the neck.

In one example, the filter assembly can have a filter media within a housing. The housing can have a support element sized and positioned to rest on a ledge on an inner surface of the neck. The housing and support element can also define one or more fill openings with the filter suspended from the ledge in the bottle to permit the reservoir to be filled while bypassing the filter media.

In one example, the cap can have a part that contacts part of the filter assembly and that holds the filter assembly against a ledge on an interior or inner surface of the neck.

In one example, the cap can have a depending cylinder that contacts a top of the filter assembly, aligns with an outlet orifice on the top of the filter assembly, and holds the filter assembly against a ledge on an inner or interior surface of the neck.

In one example, the cap can have a depending cylinder that contacts a top of the filter assembly and holds the filter assembly against a ledge on an inner or interior surface of the neck. The depending cylinder can telescope over a smaller diameter cylinder on the top of the filter assembly that defines an outlet orifice.

In one example according to the teachings of the present invention, a personal, portable drinking container includes a bottle having a perimeter side wall with a closed bottom end, a neck at a top end, a top opening at a top edge of the neck, and an interior reservoir within the side wall above the bottom end and accessible through the top opening. The bottle is formed of a flexible material. A cap is removably fitted on the neck to close off the top opening and has a dispenser orifice in the cap. An annular formation can be provided on the side wall below the neck and extends circumferentially around the bottle. The neck, the annular formation, and an upper portion of the side wall therebetween can be circular about a vertical axis of the bottle. The side wall can has a pair of opposed squeezable sides that can be curved concavely toward one another between the annular formation and the bottom end and has a pair of opposed stiff sides between the annular formation and the bottom end. The stiff sides are arranged orthogonally about the vertical axis relative to the squeezable sides.

In one example, the bottle can have an annular formation on the side wall below the neck that extends circumferentially around the bottle. The annular formation can be a groove formed into the side wall of the bottle.

In one example, the flexible material of the bottle can be a clear polypropylene material.

In one example, the bottle can have an annular formation on the side wall below the neck that extends circumferentially around the bottle. The bottle can have a waist section located between the annular formation and the bottom end with a narrower first diameter between the pair of squeezable sides compared to a second diameter between the pair of opposed stiff sides.

In one example, each of the pair of opposed stiff sides can have a depression therein that is vertically oriented.

In one example, each of the pair of opposed stiff sides can have a depression therein that is vertically oriented. Each depression can have a length that extends the majority of the length of the respective opposed stiff side between the bottom end and the annular formation.

In one example, the bottle can have an annular formation on the side wall below the neck that extends circumferentially around the bottle. At least a portion of the bottle below the annular formation can be non-circular about the vertical axis.

In one example, the bottle can have an annular formation on the side wall below the neck that extends circumferentially around the bottle. Squeezing the pair of opposed squeezable sides toward one another can deform the bottle below the annular formation but not deform the neck.

In one example according to the teachings of the present invention, a personal, portable drinking container includes a bottle having a neck at a top end, a reservoir within the bottle, and a top opening at a top edge of the neck. The top opening provides access to the reservoir. A cap is removably fitted on the neck to close off the top opening and has a connector depending centrally from the cap and a drinking orifice through the connector. A ledge can be provided on an interior surface of the bottle positioned below the top edge. A filter assembly can be supported by and suspended on the ledge within the bottle. The filter assembly can have a top, a mating connector projecting up from the top, and an outlet orifice through the mating connector. The drinking orifice and outlet orifice can be aligned with one another and the connector and mating connector can telescopically engage one another and hold the filter assembly against the ledge.

BRIEF DESCRIPTION OF THE DRAWINGS

Objects, features, and advantages of the present invention will become apparent upon reading the following description in conjunction with the drawing figures, in which:

FIG. 1 shows a top perspective view of one example of a drinking container according to the teachings of the present invention and with a cap assembly closed.

FIG. 2 shows a side view of the drinking container in FIG. 1.

FIG. 3 shows a top perspective exploded view of the drinking container including the bottle and cap assembly in FIGS. 1 and 2.

FIG. 4 shows a bottom perspective view of the cap assembly in FIG. 3.

FIG. 5 shows a top view of the cap assembly in FIGS. 3 and 4.

FIG. 6 shows a top perspective view of the upper bottle and the cap assembly opened.

FIG. 10 shows another example of a drinking container with an alternate cap and tether arrangement and a user drinking from the container.

FIGS. 11-13 show perspective views of alternate tether examples.

FIG. 14 shows a side view of another example of a drinking container according to the teachings of the present invention.

FIG. 15 shows a top perspective exploded view of the drinking container including the bottle and cap assembly in FIG. 14.

FIG. 16 shows a bottom perspective view of the cap assembly in FIG. 15.

FIG. 17 shows a side view of a filter assembly for the cap assembly in FIGS. 14-16.

FIG. 18 shows a top perspective exploded view of the filter assembly in FIG. 17.

FIG. 19 shows a top view of the filter assembly in FIG. 17.

FIG. 20 shows a cross-section taken along lines A-A in FIG. 19 of a top part of the filter assembly.

FIG. 21 shows a vertical cross-section taken along lines B-B of the container assembly in FIG. 14 and with the cap opened.

FIG. 22 shows a top perspective view of part of another example of a filter assembly.

FIG. 23 shows a cross-section similar to that in FIG. 21 with the drinking container inverted showing the water flow path and showing an alternate filter construction.

FIG. 24 shows the cross-section in FIG. 23 but with the drinking container upright and showing the return air flow path.

FIG. 27 shows the inverted drinking container cross-section in FIG. 23 and depicts the water flow and bottle squeeze action for dispensing water from the bottle.

FIG. 28 shows the upright drinking container cross-section in FIG. 24 and depicts the return air flow and the bottle rebound effect.

FIG. 31A shows a perspective exploded view of the bottle in FIG. 29 and a ring attachable to the bottle.

FIG. 31B shows a cross-section taken along line 31b-31b of the bottle in FIG. 31A after assembly.

FIG. 33 shows a plan view of the date dial of the filter assembly in FIG. 32A.

DETAILED DESCRIPTION OF THE DISCLOSURE

Figure 7:
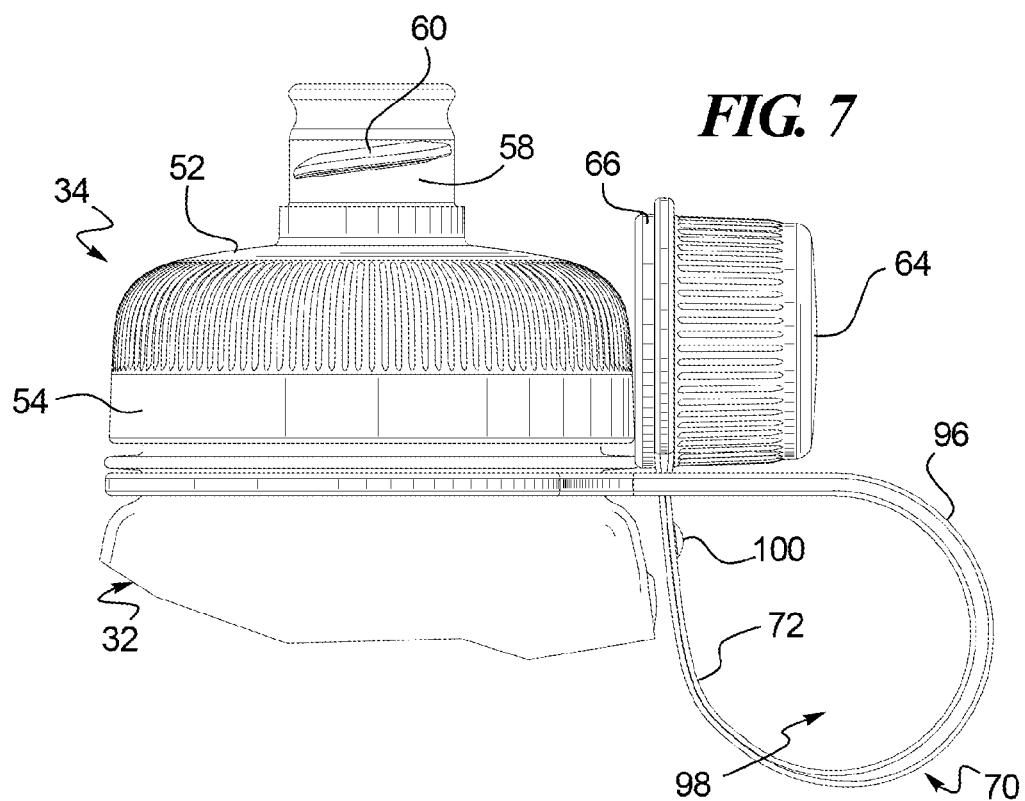
FIG. 7 shows a side view of the upper bottle and cap assembly in FIG. 6.

The disclosed personal drinking container solves or improves upon one or more of the above-noted and/or other problems and disadvantages of prior known drinking containers. The drinking container of the present disclosure has a cap assembly comprising a container cap, a spout cover, and a flexible tether or strap that turns in on itself or loops through itself. The flexible tether arrangement provides a convenient retention means for the spout cover and the container cap during drinking and during filling of the bottle. The tether can perform the dual functions of prior known tethers of providing a handhold, finger loop, or belt (hanging) loop and for connecting the cap assembly to the bottle. However, the tether can also retain the spout cover of the cap assembly separately attached to the drinking container or the cap assembly. Also, the tether securely holds the spout cover out of the way or remote from the spout for drinking from the bottle without the user having to manually holding the spout cover out of the way.

In one example, the cap assembly of the disclosed drinking container can also have a filter assembly for removing impurities in water that passes through the filter assembly during use of the container. The disclosed filter assembly provides convenient on-the-go water filtration from nearly any accessible source of water. The filter assembly can employ a filter cage or housing with flow grates. A filter media can be housed within the cage or housing. A paper filter barrier can be provided that surrounds the housing or cage and/or the filter media to filter out chunks and fines expelled from the filter media. The filter assembly can also employ a one-way check valve along the water flow path to permit a desired water flow path through the filter media and to allow a return air flow path to the evacuated bottle that bypasses the filter media.

In one example, the bottle of the disclosed drinking container can have a shape that enhances the ability of the bottle to be squeezed and to quickly rebound from same. The bottle can have a curved shape and be formed of a resiliently flexible material having a memory. Also, the contours of the bottle can be configured so the bottle is comfortable to hold, is designed to be squeezed under a predetermined, relatively low squeeze force, and so that the bottle rebounds quickly and consistently after being squeezed so that it is ready to dispense water from the bottle repeatedly and on demand.

In one example, the bottle or the filter assembly can have a date or replacement time indicator. The indicator can be such that a user is able to determine when it might be time to change out the filter media or filter assembly. The indicator can indicate to the user when the filter media was installed, when the filter media should be changed, or both. Two separate indicators can also be provided, one for each of these functions.

Turning now to the drawings, FIGS. 1-3 show one example of a drinking container 30 constructed in accordance with the teachings of the present invention. The drinking container 30 generally has a bottle 32 that is capable of holding water or other beverages and has a cap assembly 34 configured to cover the bottle. As generally shown in FIGS. 1-3, the bottle 32 has a closed bottom 36, an upstanding side wall 38 extending up from a perimeter of the bottom, and an open top. In this example, the open top of the bottle 32 is formed by an upstanding neck 40 having a top edge that defines a fill opening 42 into an interior of the bottle. An exterior surface of the neck 40 has male mechanical male threads 44 thereon. As shown in FIG. 4, the cap assembly 34 has a cap 50 with a top panel 52 and a depending skirt 54 extending down from a perimeter of the top panel. An interior surface of the skirt 54 has female mechanical threads 55 whereby the cap assembly 34 can be screwed onto on the neck of the bottle when installed.

As best illustrated in FIGS. 1, 2, 4, and 5, the cap assembly 34 also includes a spout cover 56 that can be tethered to either the cap 50 or to the neck 40 of the bottle. In one example, the cap assembly 34 can be tethered to the bottle 32, as is described below, so that the cap assembly can be completely removed from the neck 40 in order to refill the bottle via the fill opening 42 while maintaining connection of the cap assembly to the bottle so that it doesn't become lost. In another example, the spout cover 56 can alternatively be tethered to the cap 50, if desired. In FIGS. 2, 4, and 5, the cap assembly 34 is removed from the bottle 32 along with a portion of the tether otherwise connected to the bottle neck 40 in order to clearly show separation of the two components of the drinking container 30.

As best illustrated in FIGS. 6 and 7, in this example a dispenser spout 58 or dispenser orifice is centrally positioned on the top panel 52 of the cap 50. The spout 58 is hollow and has a top opening 62 to provide a flow passage through the cap assembly 34. The spout cover 56 can be selectively attached to and removed from the drinking spout 58 on the cap 50. In this example, the drinking spout 58 is an elongate cylinder with exterior male mechanical threads 60 on its outer surface. Though not shown herein, the interior annular surface of the spout cover 56 can have corresponding female mechanical threads, similar to the interior of the cap skirt 54 in this example. The spout cover 56 can screw onto the drinking spout 58 to close off the top opening 62.

Figure 8:
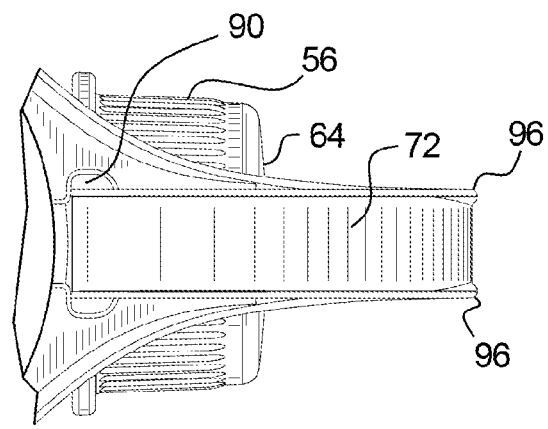
FIG. 8 shows a bottom view of part of the opened cap assembly in FIG. 7.

As shown in FIGS. 6-8, the spout cover 56 is also generally a cylinder with one closed end 64 that covers the top opening 62 when installed, such as in FIGS. 1-3. A collar 66 surrounds a bottom open end of the spout cover 56 and a groove (not shown) is formed spaced upward from the collar.

Figure 9:
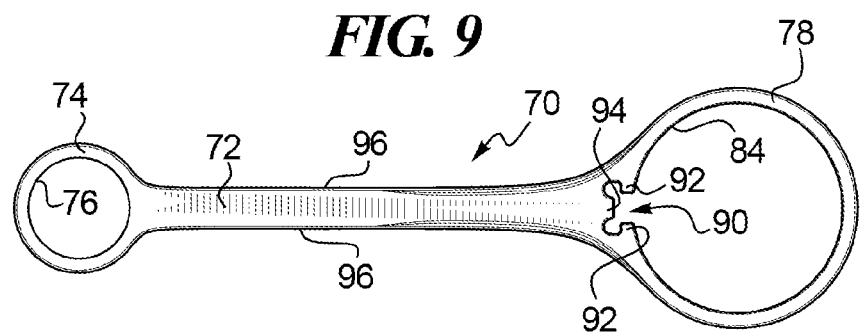
FIG. 9 shows a plan view of one example of a cap tether for the cap assembly in FIGS. 1-8 and constructed according to the teachings of the present invention.

As shown in each of FIGS. 1, 2, and 4-8, a tether 70 connects the spout cover 56 to either the cap assembly 34 or to the bottle 32. In this example, as noted above, the tether 70 connects the spout cover 56 to the bottle neck 40. FIG. 9 illustrates a plan view of the tether 70 in this example. The tether 70 has a thin body or band 72 that is elongate and resiliently flexible. The band 72 has a relatively narrow width but the width is much wider than a thickness of the band in this example of the tether. A spout connector hoop 74 is provided at one end of the band 72. In this example, the spout hoop 74 has an inner edge 76 that is sized to interferingly fit over the collar 66 on the spout cover 56 and seat in the groove (not shown) adjacent the collar. The inner edge 76 of the spout hoop 74 is sized to loosely fit in the groove so that the spout cover 56 can rotate somewhat freely relative to the connector hoop 74. Thus, the spout cover 56 in this example can be twisted or rotated within the hoop 74 in order to screw the spout cover on or off of the drinking spout 58 while the tether 70 remains stationary.

In this example, a bottle connector hoop 78 is disposed at the opposite end of the band 72 on the tether 70, as shown in FIG. 9. As shown in FIGS. 2 and 3, the bottle 32 includes an annular rib or flange 80 extending circumferentially around and projecting outward from the base of the neck 40, but above a top surface or upward facing surface 81 of the bottle. A groove 82 is formed beneath the rib or flange 80. An inner edge 84 of the bottle hoop 78 is sized to interferingly fit over the rib or flange 80 but to loosely fit in the groove 82. Thus, the tether 70 can also rotate somewhat freely relative to the bottle 32 in this example. Though not directly illustrated herein, the cap 50 in this example is not directly tethered to the bottle 32. Instead, the cap 50 is tethered to the bottle via the spout cover 56 and the tether 70. If the spout cover 56 is detached from the cap 50, and the cap is then removed from the bottle 32, the cap 50 will not be tethered to the bottle in this example. In an alternate example, the bottle hoop 78 can be connected to the cap 50 instead of the bottle 32. However, then the cap assembly 34 could be removed entirely from the bottle 32 as depicted in FIG. 3.

The tether 70 in this example also includes an open notch 90 at the end of the band 72 and facing into the bottle connector hoop 78. Two lobes of the notch extend away from one another and away from the entry into the notch 90 to form three flexible fingers within the notch. Two of the flexible fingers 92 extend laterally toward one another at the notch entry and one of the fingers 94 projects in a lengthwise direction from the end of the band toward the notch entry. Also in this example, a pair of ribs 96 is positioned one each along opposite edges of the band 72, at least near a central portion of the tether 70. The tether 70 in this example can be formed from a flexible, resilient plastic material that has some rigidity and memory, once formed. The tether in this example can also be molded in the flat or planar configuration shown in FIG. 9.

As can be seen in FIGS. 1, 2, and 4-8, the tether band 72 can be looped or bent unto itself or otherwise threaded through itself to create a loop 98, which can change in diameter and circumference. To create the loop 98, the band 72 can be bent such that the spout connector hoop 74 is passed through the opening in the bottle hoop 78. The band 72 section nearer the spout hoop 74 can be forced into the notch 90 and retained therein by the two laterally extending fingers 92, spaced apart narrower than a width of the band. The longitudinally extending finger 94 can apply pressure against a surface of the band 72, forcing the band to bear slightly against the latterly extending fingers 92 to assist in retaining the band 72 in the notch 90. The ribs 96 can be provided to assist the band in resisting flexibility and bending and to impart some resiliency to the band. The ribs 96, and the band material itself, can be chosen and designed to bias the band toward its elongate, straight configuration in FIG. 9.

With the tether 70 looped or threaded through itself as described above in this example, the size of the loop 98 created in the band body 72 can be varied by pulling on the spout cover 56 attached to the spout connector loop 74. As shown in FIGS. 1 and 2, the spout cover 56 and free end of the band 72 can be pulled to reach the drinking spout 58 and decrease the size of the loop 98. In this position, the spout cover 56 can be installed on the drinking spout 58 to close the spout. With the spout cover 56 removed from the spout as in FIG. 6, for example, the free end of the band 72 can be withdrawn to increase the size of the loop 98. This in turn will draw the spout cover 56 downward toward the notch 90 near the bottle hoop 78. As shown in FIGS. 6 and 7, the spout cover 56 will be retained in this remote position adjacent the cap skirt 54 and the band 72 until it is again pulled upward to cover the drinking spout 58. The band configuration will be biased toward the larger loop 98 size and the straighter condition and thus will be inclined to readily retain the spout cover 56 in the remote position until a user reattaches the spout cover.

As shown in FIGS. 5 and 6, the band 72 can include one or more optional projecting nubs or bumps 100 along a length of the band and spaced from the spout hoop 74. The nub 100 illustrated in the figures can be provided to seat below the longitudinally projecting finger 94 to further assist in retaining the spout cover 56 in this remote position away from the spout 58. This assures a user can freely drink from the drinking spout 58 without interference from the spout cover 56 or tether 70. A plurality of these nubs 100 can be provided along the length of the band to allow a user to selectively position the spout cover 56 relative to the band and notch 90 and to assist in retaining that selected position. In addition, one of these nubs 100 can be provided, if desired, nearer the bottle hoop 78 to assist the tether 70 in holding the band 72 in position when the spout cover 56 is installed on the spout 58.

FIG. 10 illustrates a user drinking from the drinking container 30 wherein the container includes the above-described tether 70. FIG. 10 is also provided to illustrate that a user can freely drink from the disclosed drinking container 30 without interference from the tether 70 or the spout cover 56 in accordance with the teachings of the present invention. With the remote position of the spout cover and the taught condition of the tether, the spout cover and tether will remain in this remote configuration as the user drinks.

As will become evident to those having ordinary skill in the art, details of the cap assembly 34, bottle 32, and tether 70 can vary within the spirit and scope of the present invention. For example, an alternate spout cover can be utilized. The spout hoop 74 of the tether 70 can be connected to a top end of the spout cover and not the bottom end as in the illustrated example. The tether 70 can be attached to the spout cover 58 by a plastic "button" component on the closed end 64 and yet perform as intended. Such a button can be ultrasonically welded to the spout cover 58. In either embodiment herein, the bottle 32 and the spout cover can be free to rotate within the tether hoop 74. Also as noted above, the bottle hoop 78 can be replaced by a cap connector hoop that attaches the tether 70 to a skirt of the cap, if desired, instead of the bottle. As an alternate means of closure, the spout cover 56 and the drinking spout 58 can have a snug snap-fit type closure instead of a screw-on closure. Thus, the spout cover 56 need not necessarily be rotatable relative to the tether 70. The same can be said for the connection between the tether and the bottle 32 or the cap 50. The hoop and groove connections can thus be different from that shown and described above.

FIGS. 11-13 illustrate alternate examples of tethers constructed within the spirit and scope of the present invention. In FIG. 11, a tether 110 is similarly constructed to the tether 70 described above. In this example, the tether 110 has a simple flat profile band 112, a spout connector hoop 114 at one end, and a bottle connector hoop 116 at the other end. In this example, the previously described notch 90 is replaced by a transverse slot 118 formed in the band adjacent but spaced from the opening in the bottle hoop 116. The spout hoop 114 can be slipped forcibly through the slot 118 by flexing the loop in order to thread the tether 110 onto itself. The size of the spout hoop 114 can be larger than the slot width to retain the tether in the threaded condition.

In FIG. 12, a tether 120 is shown to also be similar to the previously described tethers in overall configuration. In this example, the tether 120 also has a band 122, a spout hoop 124 at one end of the band 122, and a bottle hoop 126 at the other. The edges 128 of the band 122, the spout hoop 124, and the bottle hoop 126 each can have an enlarged, ribbed bead (not shown) that can add to the aesthetics of the tether 120, as well as to impart some rigidity or resiliency to the flexible band material. Also in this example, the notch 90 and slot 118 described above are replaced by a T-shaped slot 130. The slot 130 in this example has a leg 132 extending lengthwise along the portion of the band 122 and a laterally extending leg 134 that is spaced closer to the bottle hoop 126. The longitudinal leg 132 of the slot 130 can be sized to accept the spout hoop 124 therethrough without having to deform the spout loop. Instead, the band need only be twisted so that the hoop 124 is oriented sideways for insertion through the slot 130. The band 122 can then be forcibly seated into the lateral leg 134 of the slot 130. The width of the lateral leg 134 can be narrower than the size of the spout loop 124 to thus retain the threaded condition for the tether 120.

In FIG. 13, another alternate tether 136 is illustrated and has an even simpler construction, but is similar to the tether 110 in FIG. 11. In this example, the slot 118 is replaced by a simple rectangular notch 138 at the end of a band 140 and opening into a bottle connector hoop 142. A spout connector hoop 144 is at the other end of the band 140 and can be passed through the bottle hoop 142. The width of the notch 138 can be sized to closely match that of the width of the band 140 to assist in retaining the threaded configuration of the tether 136. As will be evident to those having ordinary skill in the art upon reading the forgoing, the configuration and construction of the band of the tether can vary within the spirit and scope of the present invention. The tether need only thread onto itself or otherwise be looped unto itself in order to function in accordance with the teachings of the present invention.

FIGS. 14 and 15 illustrate another example of a drinking container 150 constructed in accordance with the teachings of the present invention. In this example, the drinking container 150 includes a bottle 152 that is essentially identically to the bottle 32 as previously described, except that the bottle 152 is shown in FIG. 14 as being transparent. The bottle 32 described above can either be opaque or transparent, as can the bottle 152. The drinking container 150 includes a cap assembly 154 that is also essentially identical to the previously described cap assembly 34, except that in this example a filter assembly 156 is connected to or is a part of the cap assembly 154. With respect to the container 150, like reference numerals are used for like parts in comparison to the previously described drinking container 30. New reference numbers are introduced for parts that are different from or in addition to the prior described container. Thus, the cap 50, tether 70, and spout cover 56 are essentially identical to the prior cap assembly 34, though the cap 50 in this example has a feature for attaching the filter assembly 156.

FIG. 16 shows that the filter assembly 156, in one example, can be attached to an underside of a top panel 157 of the cap assembly 154. The cap skirt 54 depends downward from the top panel 157 and also has mechanical threads 60 on its interior surface. FIGS. 17 and 18 illustrate details of the filter assembly 156. In the disclosed example, the filter assembly 156 generally has a filter media 158 housed within a cage or filter housing 160. The cage 160 in this example has a removable bottom 162 and an upper body 164. The upper body 164 in this example generally has a side wall 166, a top wall 168, and a connector 170 extending upward from the top wall. The connector 170 is generally cylindrical and has male mechanical threads 172 on the exterior surface. The interior of the upper portion 164 of the cage 160 and interior of the cylindrical connector 170 are hollow in this example. A top surface 174 on the free end of the connector 170 forms an optional grate and a plurality of optional grate openings 176 are formed through the top surface. A plurality of flow openings 178 are formed through the side wall 166 of the cage in this example. The flow openings communicate between the exterior and interior of the upper body 164 of the cage 160.

The bottom 162 of the cage 160 is configured to snuggly fit within an opening in the bottom of the upper body 164 and close off the opening. In this example, an annular rib 180 projects upward from the interior side of the bottom 162. A seal or O-ring 182 is carried on the exterior or radially outward facing surface of the annular rid. The seal 182 seats against an interior surface on the open end of the upper body 164 of the cage 160 when the bottom 162 is installed. A check valve 184 is seated in a small opening at the center of the bottom 162. In this example, the filter media 158 is configured as an open cylinder as shown in FIG. 18. A smaller diameter, annular, lower guide 186 extends up from the bottom 162 within and concentric with the annular rib 180. The lower guide 186 defines a first channel 188 between the lower guide and the rib 180 on the upper or interior surface of the bottom 162. This channel 188 assists in seating the tubular filter media 158 on the bottom 162 and retaining the filter media in position when the filter assembly 156 is assembled.

The type and form of the filter media can vary from the examples disclosed and described herein within the spirit and scope of the present invention. There are many different types of water filtration media available in the market and more being developed. For example, porous, charcoal type filter blocks are known that can filter various contaminants from water sources. Also, porous plastic filters impregnated with substances capable of filtering contaminants from water are also known. Further, filter media made from natural or man-made fabrics, woven materials, and nonwoven materials are also known. These types of woven and nonwoven filter media have fibers that can be impregnated with substances capable of filtering contaminants from water. The porosity, density, pattern, and the like of these types of filter media can also be configured to capture or filter contaminants from water or other liquids. One particular example of such a filter media is described below.

Some filter media types, such as charcoal filters do have a tendency to have larger sized particles or chunks break off from the media and to have much smaller size particles or fines become detached from the media. Other types of filter media may or may not have similar problems. Virtually all of these types of filter media have a finite useful life. At some point, the filtering capabilities of the media will deteriorate to the point that the filter is ineffective or where the filtering capabilities of the media are spent. Once the filter media 158 reaches this point in its useful life, the media or the filter assembly must be replaced.

With reference to FIGS. 17-20, the disclosed filter assembly 156 can be provided with an optional replacement indicator to help the user determine when it is time to change the filter media 158 within in the assembly 156. In the disclosed example, a circumferential ridge 190 is formed on the outer surface of the filter connector 170 and is spaced upward from the top wall 168 on the cage 160. A groove 192 is formed below the ridge 190 on the connector 170. A date ring, disc, or dial 194 is depicted in FIGS. 17-20 and in this example has a generally circular configuration with a central opening 196. The central opening 196 is sized to interferingly fit over the ridge 190 on the connector 170 and to seat in the groove 192 on the filter assembly 156. In this example, the dial has a number of notches 193 formed into the edge of the opening, defining a plurality of flexible tabs 195 around the opening. The tabs can flex to allow the dial 194 to be snapped over the ridge 190 on the connector 170 and over into the groove 192. The diameter of the groove 192 and central opening 196 in the indicator dial 194 can be cooperatively sized to allow the indicator dial to permit rotation relative to the cage 160.

In the disclosed example, the underside of the dial 194 and/or the surface of the top wall 168 on the filter cage 160 can be provided with cooperating detent features 199, such as projections, bumps, protrusions, recesses, ribs, teeth, ramps, dimples, and/or the like. One such protrusion 199 is depicted on the top wall 168 in this example in FIG. 18 and one such protrusion 199 is depicted on the bottom side of the dial 194 in FIG. 20. One or the other of the dial or filter cage can include a plurality of the detent features so that the user is able to select any desired position for the dial. With such detent features 199, the dial 194 can provide positive, tactile feedback for the user during rotation to help the user orient the dial in a selected orientation. Such features 199 can also operate to assist in retaining the dial 194 in the selected position, once the dial is moved to a desired orientation on the cage 160.

A top surface of the indicator dial 194 in this example can have raised indicia 198 and/or visible markings thereon. The indicia 198 can represent various time increments relevant to a particular filter media and can vary within the spirit and scope of the present invention. In one example, the indicia 198 as shown in FIG. 19 can include a plurality of primary indicia markings 200 with the numbers 01-12 associated therewith. These numbers can indicate, for example, each month of a calendar year. The indicia also have secondary or incremental indicia 202 spaced intermittently between the primary indicia 200. The indicia 198 can change from the example shown according to the needs of a particular filter application, user need, liquid application, or the like. As depicted in FIGS. 17-19, a marker or bump 210 can be provided on a surface of the side wall 166 on the cage 160. A selected one of the primary markings 200 or secondary markings 202 of the indicia 198 on the indicator dial 194 can be aligned with the marker 210 as selected by a user. The aligned marker 210 and indicia marking can provide an indication to that user when to change the filter media 158.

The user can be provided with life expectancy information for the filter media, depending on various degrees of use of the drinking container 150. For example, one might be notified to expect a filter to last for two months under a certain type of frequent use. Before installing a new filter media 158, the user can rotate the dial in this example to align one of the markings 200 or 202 with the marker 210 on the cage 160. The dial 194 can be positioned to indicate the approximate date that the new filter media 158 is placed in the bottle 152. Knowing the expected filter life of two months, the user can then determine when to change the media 158. Alternatively, the dial 194 can be positioned to indicate the approximate expiration or spent date of the filter media 158 two months beyond the date the filter media is placed. In either case, the user can use the indicator, coupled with a known or estimated filter expected life, as an aid to determine when next to replace the filter media 158.

In another example, the entire housing 160 and filter assembly 156 can be a replaceable item, if desired. The size, shape, style, functionality, and the like of the marker 210, the dial 194, and the indicia 198 can vary from the example shown within the spirit and scope of the invention. As will be evident to those of ordinary skill in the art, the date or time feature can also vary from the monthly indicia on the dial 194 disclosed herein in this example.

FIG. 21 shows a cross-section of the cap assembly 154 and bottle 152 of the drinking container 150. As shown therein, the cap assembly 154 can be provided with a filter receptacle or cap connector 212 on the underside of the top panel 157 on the cap 50. In this example, the cap connector 212 can be formed as a cylinder with internal female mechanical threads 214 to engage the threads 172 on the filter connector 170. Thus, the filter assembly 156 can be entirely removable, interchangeable, rechargeable, or the like relative to the cap assembly 154 in this example. The cap assembly 154 can also be used with no filter assembly, if desired, similar to the container 30, cap assembly 34, and bottle 32 described above. In an alternate embodiment, a portion of the filter assembly housing or cage 160 can be formed integral with the cap assembly and another portion can be detachable, such as the bottom 162, to permit insertion and removal of the filter media 158 in order to recharge the filter assembly.

Also as depicted in FIG. 21, the bottle connector hoop 78 of the tether 70 is shown seated under the annular rib or flange 80 on the neck 40 of the bottle 152, as described above. Further, as is indicated in this figure, the flow openings 178 in the side wall 166 on the cage provide flow access into the filter assembly 156 to the filter media 158 from the interior of the bottle 152. Also as shown in FIG. 21, an annular upper guide 218 can depend down from the underside of the top wall 168 on the cage upper body 164. A second channel 220 can be formed between the annular upper guide 218 and an interior side of the cage side wall 166. The filter media 158 in this example can thus also be seated and retained in the second channel 220, as well as the first channel 188, when installed within the cage 160 to further capture and retain the filter media in position during use.

FIG. 21 also illustrates that the optional grate openings 176 in the top end 174 of the filter cage 160 are in the flow path defined by the spout 58 in the bottle 152 and the connector 170 on the filter assembly 156. Depending upon filter type, the grate openings 176 can be eliminated or can be configured, positioned, and sized so as to block the passage of larger chunks of filter media material or other contaminants from entering the water stream to be consumed by a user. As noted above, charcoal type filters are known to lose chunks of filter material on occasion. As will be evident to those having ordinary skill in the art, the use of, number, size, placement, configuration, and the like of the optional grate openings 176 can vary within the spirit and scope of the present invention. In the example shown in FIGS. 18 and 19, the grate openings 176 vary in size and are arcuate in shape. FIG. 22 illustrates a top end view of a portion of an alternate filter assembly 228 with a modified pattern of optional grate openings 230. The grate openings 176 or 230, if provided, can be molded as part of the dispensing opening at the top of the filter cage 160 as shown. Alternately the grate openings can be formed integrally or separately inserted within the flow path of the cap assembly spout 58, if desired.

As depicted in FIGS. 23 and 24, the filter assembly 156 can be further modified to include a film layer, paper liner, or "tea bag" material 232 positioned on the interior side of the filter media 158 (FIG. 23) and/or on the exterior side (FIG. 24). The paper liner 232 can be an additional filter designed to eliminate smaller sized particles or fines from the water stream. As noted above, filter media such as charcoal filters also have a tendency to lose very small particles or fines during use. The paper liners 232 can be of a type so as to filter out particles down to a specific particle size. The liners 232 can be positioned to eliminate or significantly reduce passage of fines to the outgoing water stream (interior liner FIG. 23) or to eliminate or reduce fines being dropped into the liquid in the bottle (exterior liner FIG. 24). The paper liner material 232 can be optionally used on the exterior side, the interior side, or both of the filter media in this example. Providing the paper liner 232 on both sides of the filter media can assist in preventing fines from entering the water within the bottle as well as entering the water stream exiting the bottle. One difficulty with adding one or more additional filter layers such as paper liners 232 is that the additional layers can increase the resistance to water flow through the filter assembly 156. Simply adding the filter assembly 156 can also reduce flow of water being dispensed to a user from the container 150.

FIG. 23 shows the cross-section in FIG. 21 with the drinking container 150 in an inverted, dispensing or drinking orientation. As illustrated, water can flow from the bottle only through the flow openings 178 in the side wall 166 of the filter cage 160. Water is prevented from flowing through the bottom 162 of the filter cage by the check valve 184. The check valve has a stem 224 that passes through the hole in the bottom 162. A head 226 is on one end of the stem 224. In this orientation, the check valve 184 will close the hole in the bottom 162 with the head 226 borne against the bottom 162, preventing water from bypassing the check valve. The filter assembly 156 in this example can include weep holes 234 in the bottom 162 to allow for drainage of water from the filter cage when the bottle is returned to the upright position of FIG. 24. The weep holes 234 in this example are illustrated in FIG. 16 and can be aligned with a bottom edge of the filter media 158. Thus, even if water enters the filter assembly 156 through the weep holes 234, the water will have to pass through the filter media before exiting the bottle 152.

FIG. 24 shows the cross-section in FIG. 21 with the drinking container 150 in an upright position. As illustrated, air can flow into the bottle through the spout 58 and bypass the filter assembly 156 via the open check valve 184. The check valve 184 can be configured to open as needed to permit air to freely enter the bottle if evacuated of liquid and/or air during use. In this orientation, the check valve 184 is free to open by gravity or a pressure differential between the atmosphere and the evacuated interior of the bottle 152. The one-way check valve 184 aids the bottle 152 in rebounding by increasing the volume/unit time or velocity of air travelling back into the bottle through the filter assembly 156. The air can return directly through the check valve 184 in the bottom 162 of the cage 160, bypassing the filter media 158.

Figure 25:
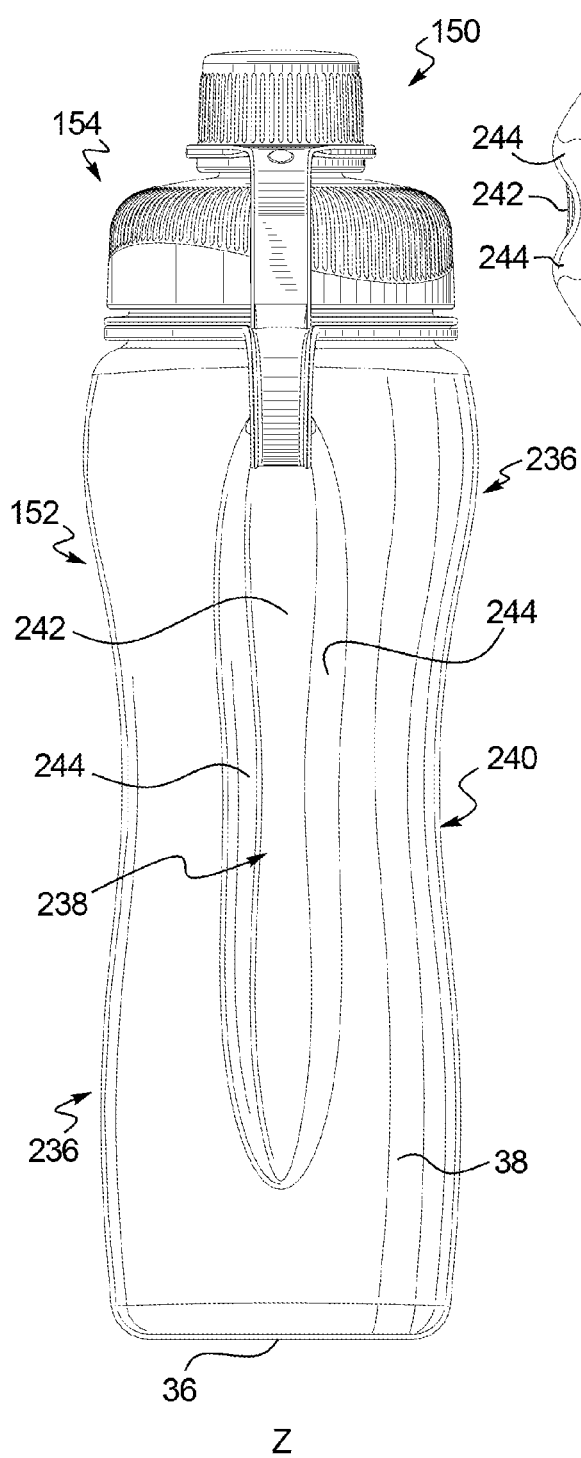
FIG. 25 shows an alternate side view of the drinking container in FIGS. 1 and 2.
Figure 26:
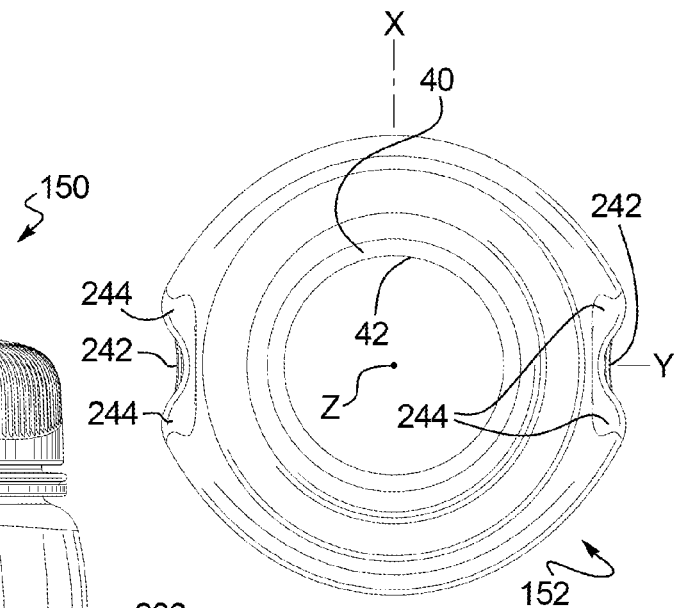
FIG. 26 shows a top view of bottle of the drinking container in FIGS. 1, 2, and 25.
Figure 29:
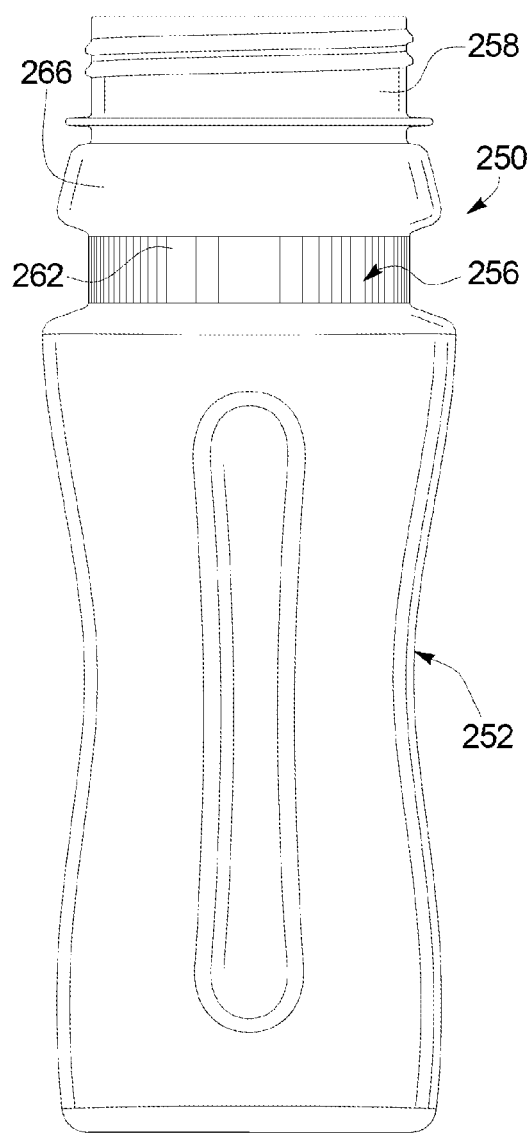
FIG. 29 shows a side view of another example of a drinking container bottle according to the teachings of the present invention.
Figure 30:
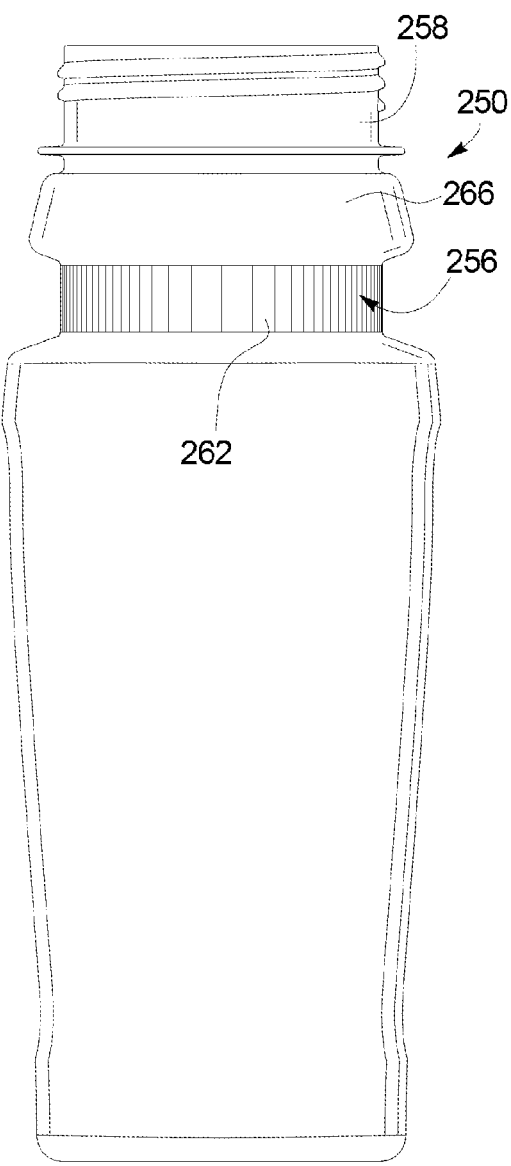
FIG. 30 shows an orthogonal side view of the bottle in FIG. 29.

In the disclosed example, the bottles 32 and 152 can also be configured to assist in dispensing water through the filter assembly 156, with or without the paper liners 232, and can assist in the bottle snapping back or rebounding after a squeeze to its expanded normal state. With reference to FIGS. 14, 25, and 26, the bottle 152 can be fabricated from a resilient flexible plastic material that permits the bottle to be squeezed. Thus, a user can invert the bottle to the configuration in FIGS. 23 and 27 and squeeze the bottle to dispense water.

In the disclosed examples, the bottle 152 is described with reference to a vertical z-axis, a width-wise y axis and a depth-wise x-axis. The bottle has two concave sides 326 that are aligned with the x-axis. The concave sides 236 have a tapered, narrower waist section 240 in the x-axis direction and along the vertical z-axis. The tapered waist section 240 is located vertically along the z-axis at about a midpoint of the bottle (FIG. 25). The bottle 152 also has two stiffened sides 238 aligned with the y-axis, normal to the x-axis. The stiffened sides 238 in the region of the waist section 240 are not inwardly tapered (see FIGS. 2 and 14), but convex or slightly outwardly bulged or bowed in the y-axis direction this example along the z-axis. The convex sides are generally smooth and free of other surface contours other than the taper at the waist 240.

Vertically elongate recesses 242 extend in the z-axis direction and are positioned on each of the two stiffened sides 238 on the bottle 152 and are aligned with the y-axis. Each of the recesses 242 is bounded by a vertical rib 244 or transition curve on opposite sides of the recess. The recesses 242 and ribs 244 assist in retaining the contour of the stiffened sides on the bottle 152 along the y-axis. Along with the outward bow, the recesses 242 and ribs 244 resist squeezing the stiffened sides 238 of the bottle in the y-axis direction. Along with the resilient, flexible nature of the bottle material, the concave shape and smooth contour of the concave sides 236 of the bottle 152 permit the bottle to be easily squeezed inward in the x-axis direction (see FIG. 27). When a user squeezes the concave sides 236 of the bottle 152 in the inward x-axis direction, the recesses 242 and ribs 244 of the stiffened sides will further outwardly bow slightly. As soon as the user releases the concave sides, however, the stiff nature of the recess and rib contour on the stiffened sides 238 will quickly return to their at rest or original shape. This will in turn assist in returning the concave sides 236 to their respective at rest or original shape. As a result, the bottle 152 will quickly rebound to its original, non-squeezed shape immediately upon release of the squeeze pressure. The narrowed waist section 240 also provides a comfortable gripping location and contour for the user. The user can easily grip the bottle at the tapered waist section and squeeze the bottle on the smooth, concave sides 236 to dispense water. The shape of the bottle 152, and particularly the recesses 242 and ribs 244 of the stiffened sides 238 will encourage the bottle to quickly snap back or rebound.

FIG. 27 shows the bottle 152 in the inverted orientation of FIG. 23 being squeezed in the direction of the arrows S along the x-axis direction at the tapered waist section 240. Water is then dispensed through the filter assembly 156 and out the spout 58. FIG. 28 shows the bottle 152 upon rebounding or snapping back to its original shape upon being returned to the upright orientation. The waist section 240 rebounds in the direction of the arrows R as air flows back into the evacuated bottle downward through the filter assembly 156 and bypassing the filter media 158 via the check valve 184. Even if the bottle 152 is not returned to the orientation in FIG. 28, the bottle structure will assist to quickly rebound the bottle to its original shape, ready for another squeeze. The bottle shape can help pump air back into the evacuated space of the bottle through the filter media or even the closed check valve if the bottle remains in the FIG. 27 orientation between squeezes.

The contours of the bottle 152 (and the bottle 32) can be designed to minimize squeeze force and improve rebound speed during use. In this example, the bottle 152 has a non-round cylinder shape as best illustrated in FIG. 26. The bottle surfaces can include elongate concavities, depressions, ribs, or other indentations or projections, different from the recesses 242 and ribs 244 shown and described herein. These devices can encourage the flexible bottle to "snap back" to its original shape after being squeezed. Thus, a user can have the ability to squeeze the bottle quickly and repeatedly. The snapping action increases the speed at which air returns to the interior space of the bottle, also aided by air return facilitated by the one-way check valve. The indentations can also assist in giving the user an improved grip of the bottle.

Other aspects of the bottle shape and configuration can also vary within the spirit and scope of the present invention. With reference to FIGS. 29-31b, an alternate bottle 250 is shown and described. In this example, the bottle 250 has concave or squeezable sides 252 and stiffened or stiff sides 254 substantially similar to the bottles 32 and 152 described above. However, in this example, the bottle 250 also has a circumferential or annular formation near a neck 258 on the bottle. In one example, the annular formation is a recessed groove 256 formed around the bottle 250 below but near a neck 258 of the bottle. In one example, the groove 256 can be provided to accept a ring 260 therein. In one example, the ring can be formed of a resilient, stretchable material, which can forcibly be installed over the neck 258 and into the groove 256. In another example, the ring 260 can be a continuous plastic ring and the bottle 250, ring, and groove 256 can be sized so that the ring can snap into the groove. In yet another example, the ring 260 can be a discontinuous ring and can expand to be slipped over the top or bottom or the bottle 250 into the groove.

The groove 256 and ring 260 can be provided simply as decorative elements to enhance the aesthetic appearance of the bottle 250. In another example, the ring 260 can be rotatable relative to the bottle 250 and be provided with indicia and used as a time/date indicator for filter change reminders, similar to the dial 194 described above. In yet another example, the ring 260 can provide both functions. If the ring 260 provides a useful life indicator function for the filter assembly, both the ring 260 and the groove 256 can be provided with detent features such as ribs 262 on the groove surface and corresponding ribs 264 on the inner surface of the ring. In one example, the groove 256 can be provided to create a break between the squeezable portion of the side wall 252 and the neck 258. Such a break can be used so that the neck does not deform when the bottle 250 is squeezed, thus preventing leaks between the cap and neck during use. In such an example, the annular formation, an upper portion 266 of the side wall 252 above the formation, and the neck can be circular but the side wall below the formation 256 can be other than circular without affecting the cap to bottle seal during use.

Figure 32A:
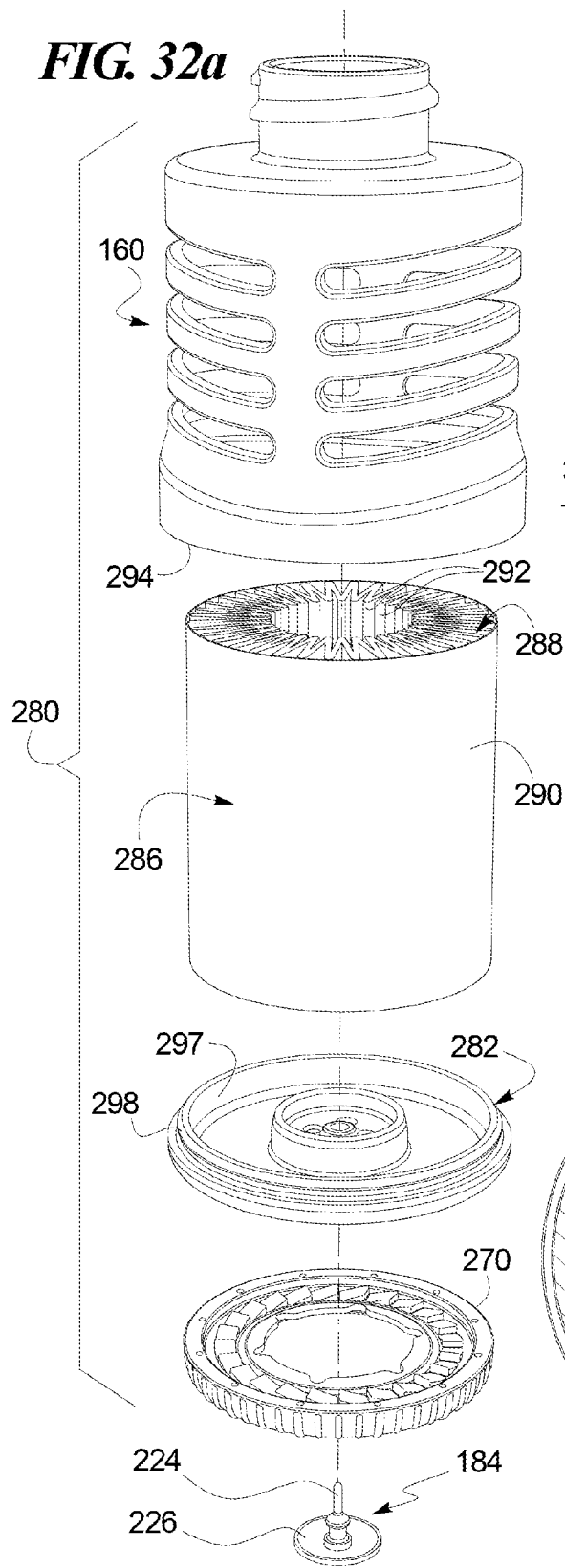
FIG. 32A shows an exploded view of another example of a filter assembly according to the teachings of the present invention.
Figure 32B:
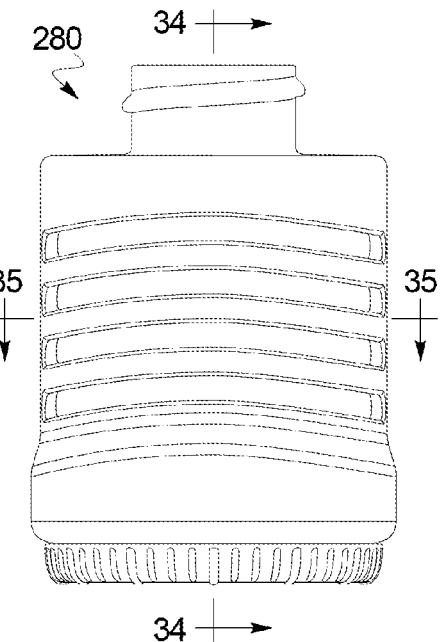
FIG. 32B shows a side view of the filter assembly in FIG. 32A after assembly.
Figure 35:
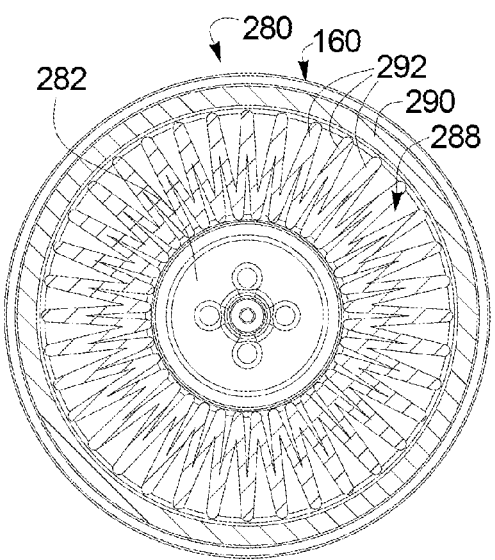
FIG. 35 shows a cross-section taken along line 35-35 of the filter assembly in FIG. 33B.

FIGS. 32A-35 show another example of a filter assembly 280 with several features having alternate constructions to those discussed above. As noted above, the optional time/date dial can vary from the dial 194 described above. An alternate example of a date dial 270 is illustrated in FIGS. 32A, 32B, and 33. In this example, the dial 270 has indicia 272 that differ from the earlier described indicia 196 for the dial 194. In this example, the indicia 272 include primary indicia 274 depicted as the months of the year in abbreviated word form JAN-DEC. The indicia 272 also include secondary or incremental indicia 276 further dividing the primary month indicia 274.

Figure 34:
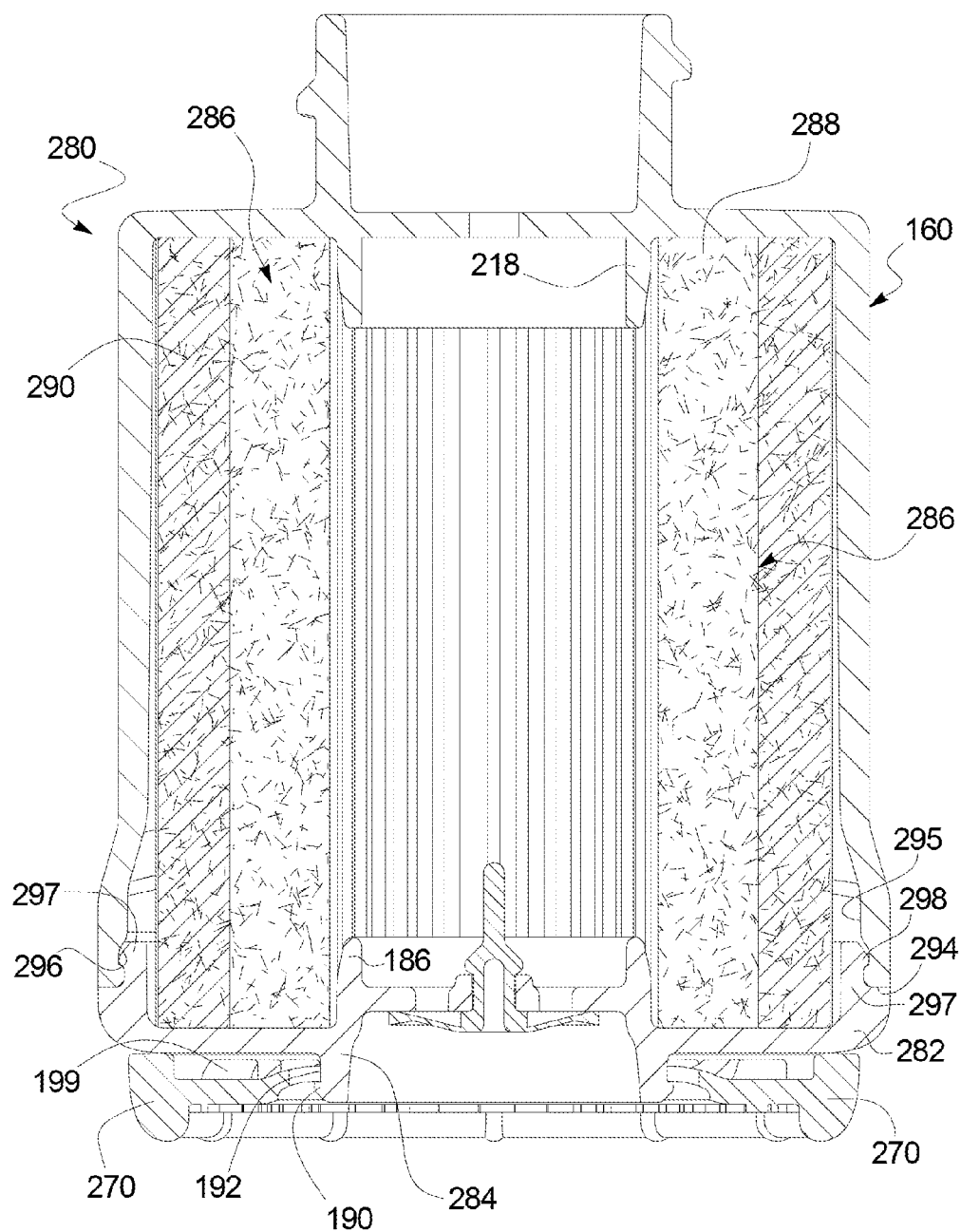
FIG. 34 shows a cross-section taken along line 34-34 of the filter assembly in FIG. 33B.

The optional date dial or dial feature can also be positioned on the bottle or filter assembly in locations different than the above-described dial 194. As noted above, the bottle ring 260 can be utilized to provide a filter change date aid. In this alternate example, the date dial 270 is shown in FIGS. 33 and 34 as being provided on the bottom of the filter assembly 280. In this example, the cage 160 has a modified bottom 282, which is configured without the weep holes 234, but with an annular connector 284, similar to the ridge 190 and groove 192 on the connector 170 described above, for snapping the dial 270 thereon.

FIGS. 32A-35 also show that the filter assembly 280 can be configured to house a variety of different filter media types therein. In this example, the filter assembly 280 houses a filer media 286 constructed of multiple layers and the overall assembly can have unique features. In one example, the filter assembly can have a cage 160 formed from a biodegradable-polymer containing an antimicrobial additive. A bio degradable additive can be used with a polypropylene (PP) material to optionally help break the PP polymer down in the right environment after it is thrown away. The optional antimicrobial additive will help keep bacteria from growing within the filter during periods of non-use.

The filter media 286 can be formed with a pleated, cellulose media layer 288. The cellulose layer 288 can be impregnated with activated carbon for filtering common chemicals from tap water or the like. The cellulose layer 288 can then be covered with a non-woven fabric layer or film layer 290. The cellulose layer 288 can have multiple pleats 292 to greatly increase the surface area of the media. This can result in a faster flow rate during each bottle squeeze. The activated carbon can be provided to absorb chemicals and minerals in the water, such as Chlorine. The non-woven fabric layer 290 can be provided to improve the appearance of the black, impregnated, cellulose media and to keep all of the activated carbon inside the filter media structure.

The cellulose layer can in one example be made from a traditional cellulose paper making process. However, the formula ingredients could be added while the sheet is being formed. The sheet can then be folded or pleated to increase the surface area of the layer. This process is common for pre-filters and air filters. The pleated media layer 288 can then be assembled, adhered, glued, or otherwise joined to the cage 160 and bottom 282 so that no water bypass the media 286. The non-woven fabric or film layer 290 can also assist in holding any fines within the filter media 286 that are released from the impregnated cellulose layer 288. The non-woven material can be like a tea bag layer, similar to the layer 232 described above. Such a layer 290 can offer a slight change in color to the filter media 286 as well. The filter media 286 can be provided with its own stand alone end caps prior to being installed in the cage or can use the cage and bottom as the end caps to help retain the shape of the media.

In an alternate example, a filter media or assembly can be executed by forming a porous plastic tube, which could be capable of use with or without a cage as described herein. Some companies extrude porous plastic in tube form with a filtering formula mainly of activated carbon. This process can, however, create a skin on the outside of the filter, which may require considerably more pressure to overcome than other types of filters. Such an extrusion process may also require separate tops and bottoms or end caps to be made and installed because there is no end to the tube extrusion. A porous plastic filter could also be formed using a sintered or compression molding process. Such filter materials will typically require long cycle times, and therefore might result in a filter of higher cost. The bottom line is that the filter media configuration and construction can vary from the examples shown and described herein.

The filter cages described herein can vary in configuration and construction as well. In the example shown in FIG. 34, the top end or wall 168 of the cage 160 of the filter assembly 280 is integrally formed as a part of the cage. The modified bottom 282 in this example is a separate cover that snaps onto the cage's open end 294. In this example, the interior surface 295 of the cage 160 near the open end 294 has a groove 296. An annular flange 297 projects up from the modified bottom 282 and has a circumferential rib 298 protruding radially outward. The rib 298 snaps into the groove 296 to install the bottom 282 on the housing. As will be evident to those having ordinary skill in the art, the top wall can be designed to be removable and the bottom can be integral with the cage. The removable part, the bottom 282 in this example, can be design only for assembly and not for later removal. Alternatively, the removable part can be designed to allow a user to reuse the cage and to only swap out the filter media for replacement.

The filter assemblies disclosed and described herein can also attach or mount to the bottles in various different ways. The filter assemblies could snap onto, thread onto or into, or otherwise attach to the underside of the cap assembly 154 or to the bottle. This will position the filter assembly 156 or 280, for example, in the flow path or upstream of the outlet orifice of the bottle as shown. The filter assembly 156 or 280 can be easily removed, recharged, or replaced as needed.

Figure 36:
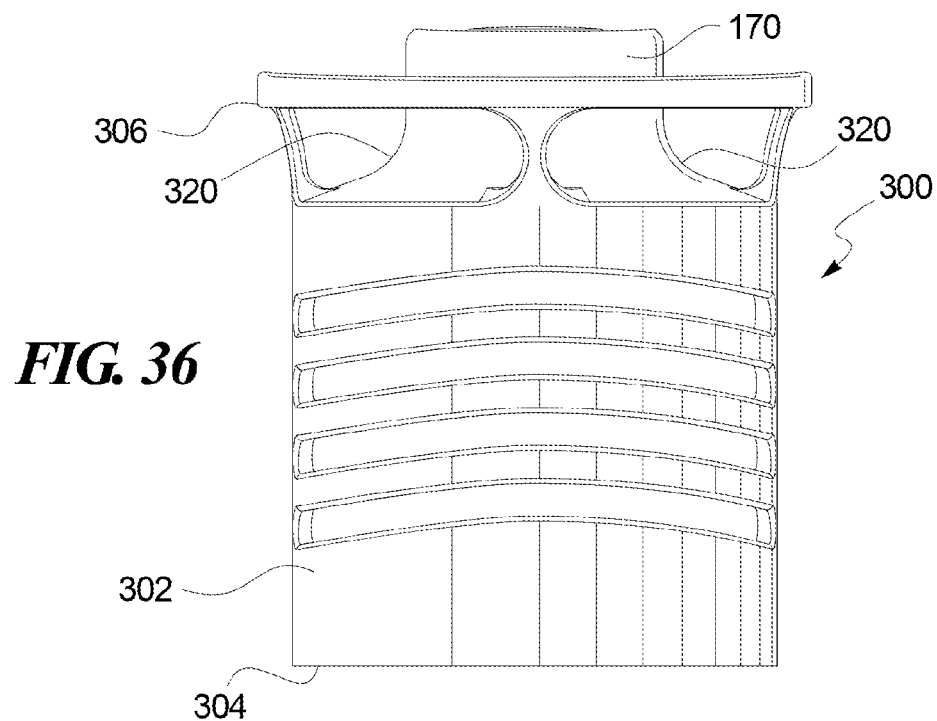
FIG. 36 shows a side view of another example of a filter assembly according to the teachings of the present invention.
Figure 37:
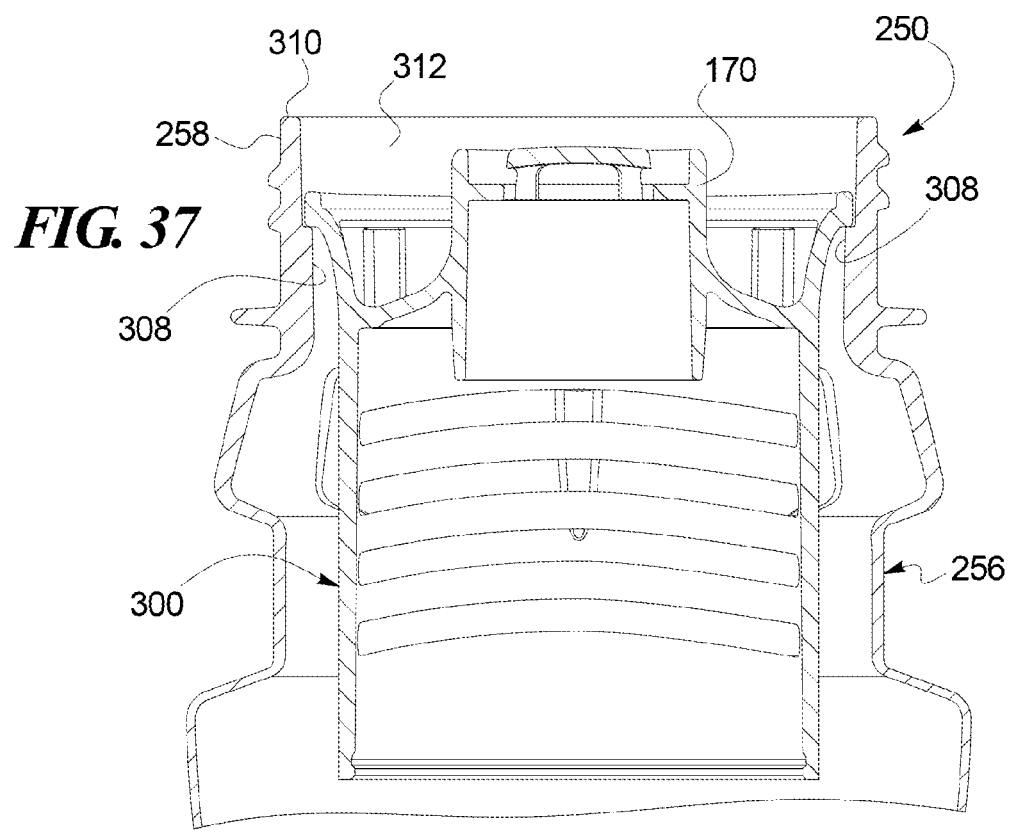
FIG. 37 shows a cross section of the bottle in FIG. 31B and with the filter assembly in FIG. 36 installed therein.

FIGS. 36 and 37 illustrate another alternate example of a filter assembly 300 constructed in accordance with the teachings of the present invention. In this example, the filter assembly has a modified housing or cage 302. The cage 302 has a removable bottom 282 (not shown in these figures) as described above. The cage 302 in this example also has a support in the form of a ring or flange 306 located near a top end of the assembly 300. The support flange 306 extends circumferentially around the cage 302 and has a diameter larger than any part of the filter assembly 300 below the flange.

In this example, the bottle 252 has a ledge inside the bottle below the top edge 308 of the neck 258. In this example, the ledge is created by a plurality of ribs 310 on the interior surface 312 of the bottle's neck 258. The ledge can alternatively be created as a continuous rib around the interior of the bottle. The cage 302 is sized to slip into the neck, bypassing the ledge or ribs 310. The flange 306 is sized to rest directly on the ledge or ribs as shown in FIG. 37. Thus, in this example, the entire filter assembly 300 can simply be dropped into the neck 258 of the bottle 250 and then the cap assembly 34 can be installed on the bottle. The filter assembly 300 does not screw onto or otherwise attach to any part of the bottle 250 or cap assembly 34 in this example. The filter assembly 300 is also not captured between the cap assembly 34 and the bottle neck 258 when installed. Instead, the assembly 300 is simply suspended from the ledge within the bottle during use. To replace the filter assembly 300, the user need only remove the cap assembly 34, lift out the entire assembly, discard the assembly or swap out the media, and replace the assembly with a new or recharged one.

Figure 38:
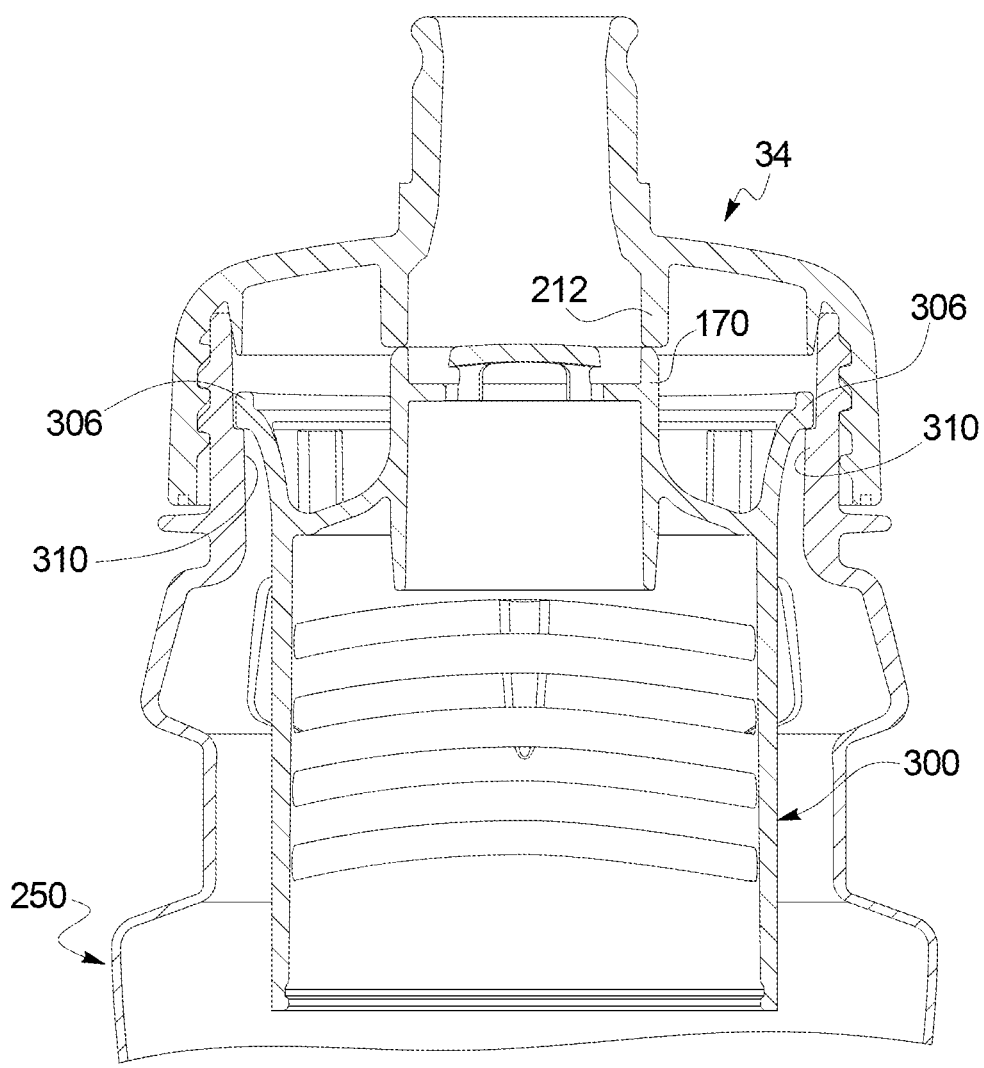
FIG. 38 shows the bottle in FIG. 37 with the cap installed thereon.

Once the filter assembly 300 is installed, the cap, such as the cap assembly 34, can be installed on the neck 258 as in FIG. 38. In this example, the connector 212 can be provided without the mechanical threads but still protruding from the underside of the cap. The connector 212 in this example is designed to applied pressure to the top of the connector 170 on the cage 302. This in turn will hold the flange 306 against the ledge or ribs 310 and thus retain the filter assembly 300 in place.

Figure 39:
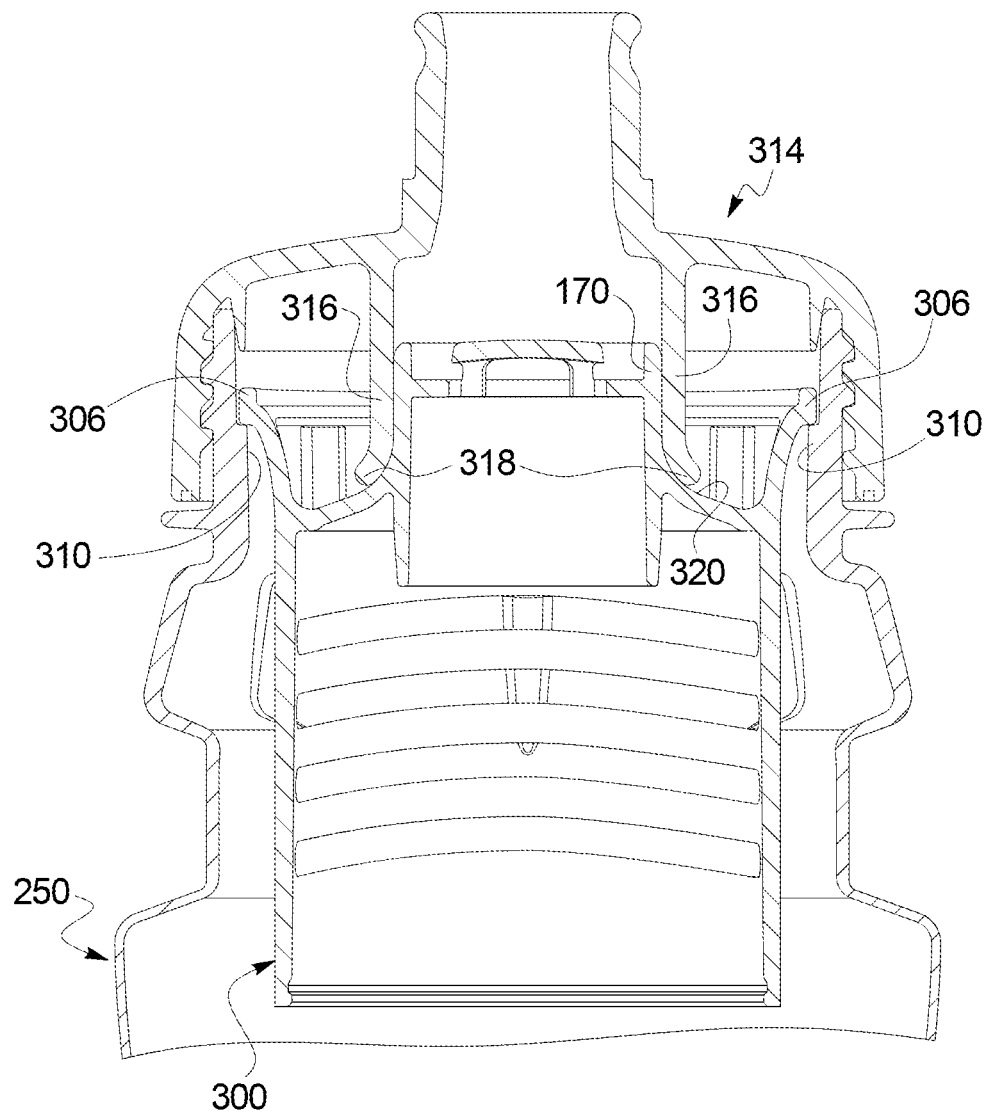
FIG. 39 shows an alternate example of a filter assembly and cap arrangement similar to that in FIG. 38.

FIG. 39 shows an alternate cap 314 with a cap connector 316 protruding from an underside of the cap. In this example, the connector 170 is again a cylinder with an open or hollow center to define an outlet orifice from the filter assembly. The cap connector 316 is also a cylinder that defines the drinking orifice through the cap 314. In this example, the cap connector is sized to telescope over the connector 170 of the filter cage 160. The distal ends 318 of the cap connector 316 can be curved or flexible to bear and seat against a curved portion 320 at the lower end of the connector 170 on the cage 160. This can create a seal between the cap and the filter cage.

Thus, as described herein, the optional filter assembly can be attached to or installed in the bottle in a variety of different ways. Alternatively, the disclosed drinking container 150 may optionally be assembled without a filter assembly 156, 280, or 300 can still be used for drinking, especially for beverages other than water. The container would then be identical to the container 30 described above. The tether arrangement can also be employed with or without the filter assembly on the cap assembly and the filter assembly can be employed with or without the tether arrangement.

As shown in FIG. 36, the support, such as the ring or flange 306 in this example is provided with one or more fill openings 322. The fill openings are large so as to allow free flow of water or liquid through the openings. When the filter assembly 300 is installed and suspended by the support 306 on the ledge 310, the openings allow the bottle 250 to be refilled with the filter assembly 300 remaining in the bottle. A user need not remove the filter assembly to refill the bottle 250. The filter is thus much less susceptible to contacting a contaminated surface during its useful life. The user also need not remove and hold the filter assembly while refilling the bottle.

A variety of materials and manufacturing methods can be used to fabricate the various components of the disclosed drinking containers. The tether straps can be injection molded from a flexible polyethylene, such as a linear low density polyethylene (LLDPE) or other suitable material. The strap could alternatively be made of nylon, neoprene, or any other flexible materials suitable for straps. The filter housing materials and manufacturing methods can vary widely. The venting and "screening" details can be features that are integrally molded into the components or added as secondary processes or parts. The one-way vent or check valve can be fabricated from plastic and/or silicon, or other materials or material combinations. The valve can be snapped into place and capable of moving between open and closed positions (the valve shown in the FIGS. herein is generically shown as having only one position but in practice would be capable of opening and closing).

The bottle materials and manufacturing methods can also vary widely, but the bottle is preferably squeezable and thus formed of a flexible material, such as polyethylene or polypropylene. The bottle is also preferably clear. Clarity will allow a user, if a filter is utilized, to see the water they are about to drink and visually determine that the water is clear and clean for drinking. Clarity is typically not provided in a squeezable bottle. Clarity is usually provided using an opaque, rigid, non-squeezable material such as Polycarbonate, Triton, or Polystyrene. Squeezable LLDPE is typically at best milky or smoky and not clear. However, a combination of clarifiers and impact modifiers can be added to polypropylene, for example, to render the bottle both flexible and clear.

The filter media 158 or 286 as disclosed herein need not be a hollow circular cylinder, but instead can be a solid body and/or a different shape from that shown. The configuration of the generic media 158 described above functions well with the disclosed filter assembly and its various features.

The disclosed tether keeps the cap assembly connected to the bottle during refilling of the bottle. The tether also keeps the spout cover out of the way while a user drinks from the bottle. The tether also keeps the spout cover connected to the bottle during use so that it is not lost when the bottle is opened. The looped band of the tether also creates a handle or hanger feature. The disclosed bottle assists a user in quickly and repeatedly drinking from the filtered bottle without a high squeeze force and long delays between drinks. The filtered bottle also allows a user to take water from many sources without having to worry about the cleanliness of the source.

Drinking containers are disclosed herein that can allow a user to see the water or other liquid they are about to drink, while still being able to easily squeeze the bottle in order to force water from the bottle. If a filter is used with the disclosed containers, the user can still easily squeeze the bottle to dispense water or other liquid through the filter and into their mouth. This experience will be closer to a non-filtered water bottle than any other filter bottle currently known or available in the marketplace. The disclosed filter assemblies can be constructed to allow only the media to be replaced, reducing the amount of waste when using the containers. The filter assemblies can also be constructed so as to be green or environmentally friendly, while still being completely disposable as an entire unit. This can create less guilt in a user when throwing a filter assembly away. The filter can be configured to remove contaminants or chemicals, such as Chlorine from municipal tap water, allowing consumers more options to refill away from home. The filters can also be configured to perform more sophisticated filtering of chemicals and contaminants, if desired. The disclosed drinking containers can allow consumers to save money, drink more water, and help reduce the amount of garbage sent to the landfill.

Although certain bottles, cap assemblies, cap tethers, filter assemblies, and features have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A personal, portable drinking container comprising:
  a bottle having a perimeter side wall with a closed bottom end, a neck at a top end, a top opening at a top edge of the neck, and an interior reservoir within the side wall above the bottom end and accessible through the top opening, the bottle being formed of a flexible material;
  a cap removably fitted on the neck to close off the top opening and having a dispenser orifice in the cap;
  a filter assembly removably coupled to a portion of the container and at least partially disposed in the interior reservoir, the filter assembly comprising:
    a cage having a side wall with flow openings through the side wall, a top end with an outlet orifice, a closed bottom end, and an annular connector extending outward from the top end or the closed bottom end; and a filter media having a generally cylindrical shape with an open center and disposed between the bottom end, the side wall, and the top end of the cage, wherein the filter media has a finite useful life and the filter assembly includes an indicator that is coupled to the annular connector of the cage and is user positionable to indicate at least one parameter relevant to the useful life of the filter media; and an annular formation in the side wall below the neck and extending circumferentially around the bottle, wherein the neck, the annular formation, and an upper portion of the side wall therebetween are circular about a vertical axis of the bottle, wherein the side wall has a pair of opposed squeezable sides curved concavely toward one another between the annular formation and the bottom end and a pair of opposed stiff sides between the annular formation and the bottom end, the stiff sides being arranged orthogonally about the vertical axis relative to the squeezable sides.

2. The drinking container according to claim 1, wherein the annular formation is a groove formed into the side wall of the bottle.

3. The drinking container according to claim 2, further comprising a ring removably arranged in the groove.

4. The drinking container according to claim 1, wherein the flexible material is a clear polypropylene material.

5. The drinking container according to claim 1, wherein a waist section of the bottle located between the annular formation and the bottom end has a narrower first diameter between the pair of squeezable sides compared to a second diameter between the pair of opposed stiff sides.

6. The drinking container according to claim 1, wherein each of the pair of opposed stiff sides has a depression therein that is vertically oriented.

7. The drinking container according to claim 6, wherein the depressions each have a length that extends the majority of the length of the respective opposed stiff side between the bottom end and the annular formation.

8. The drinking container according to claim 1, wherein at least a portion of the bottle below the annular formation is non-circular about the vertical axis.

9. The drinking container according to claim 8, wherein squeezing the pair of opposed squeezable sides toward one another deforms the bottle below the annular formation but does not deform the neck.

10. The drinking container according to claim 1, wherein when the filter assembly is coupled to the portion of the container, the indicator is arranged within the interior reservoir.

11. A filter assembly for a personal, portable drinking container, the filter assembly comprising:

a cage having a side wall with flow openings through the side wall, a top end with an outlet orifice, a closed bottom end, and an annular connector extending outward from the top end or the closed bottom end;

a filter media having a generally cylindrical shape with an open center and disposed between the bottom end, the side wall, and the top end of the cage, the filter media having a pleated layer formed of a non-woven, cellulose material and a film layer positioned radially adjacent and in contact with the pleated layer, the film layer formed of a non-woven fabric material; and a one-way check-valve coupled to and seated in an aperture in the closed bottom end aligned with the open center of the filter media, wherein the filter assembly is capable of a liquid flow rate of at least about 15 ml/sec passing through the filter media, and wherein the filter media has a finite useful life and the filter assembly includes an indicator that is coupled to the annular connector of the cage and is user positionable to indicate at least one parameter relevant to the useful life of the filter media.

12. The filter assembly according to claim 11, wherein the filter media has a pore size in the range of about 1-10 micron.

13. The filter assembly according to claim 11, wherein the filter media is capable of reducing the amount of Chlorine in water passed through the filter media by at least 50%.

14. The filter assembly according to claim 11, wherein the pleated layer is impregnated with activated carbon.

15. The filter assembly according to claim 11, wherein the bottom end is an end cap snapped onto the cage.

16. The filter assembly according to claim 11, wherein the pleated layer is positioned radially inward of the film layer.

17. The filter assembly according to claim 11, wherein the indicator is rotatably coupled to the bottom end of the cage.

18. The filter assembly according to claim 11, wherein the indicator is rotatably coupled to the top end of the cage.

19. The filter assembly according to claim 11, wherein the closed bottom end has an annular wall that fits within the side wall of the cage.

20. A personal, portable drinking container comprising:

a bottle having a perimeter side wall with a closed bottom end, a neck at a top end, a top opening at a top edge of the neck, and an interior reservoir within the side wall above the bottom end and accessible through the top opening, the bottle being formed of a flexible material;

a cap removably fitted on the neck to close off the top opening and having a dispenser orifice in the cap;

a filter assembly coupled to a portion of the cap and at least partially disposed in the interior reservoir; and an annular formation in the side wall below the neck and extending circumferentially around the bottle, wherein the neck, the annular formation, and an upper portion of the side wall therebetween are circular about a vertical axis of the bottle, wherein the side wall has a pair of opposed squeezable sides curved concavely toward one another between the annular formation and the bottom end and a pair of opposed stiff sides between the annular formation and the bottom end, the stiff sides being arranged orthogonally about the vertical axis relative to the squeezable sides, the drinking container further comprising a ring removably coupled to the annular formation, wherein the filter assembly has a finite useful life, and wherein the ring includes an indicator that is user positionable to indicate at least one parameter relevant to the useful life of the filter assembly.

* * * * *